(12) United States Patent
Huang et al.

(10) Patent No.: US 11,631,930 B2
(45) Date of Patent: Apr. 18, 2023

(54) WIRELESS COMMUNICATION STRUCTURE, DISPLAY PANEL AND WIRELESS COMMUNICATION APPARATUS

(71) Applicant: Yungu (Gu'an) Technology Co., Ltd., Hebei (CN)

(72) Inventors: Huan-Chu Huang, Taoyuan (CN); Jie Wu, Langfang (CN); Shuang Cui, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 17/888,869

(22) Filed: Aug. 16, 2022

(65) Prior Publication Data

US 2022/0393336 A1 Dec. 8, 2022

(30) Foreign Application Priority Data

Apr. 24, 2022 (CN) .......................... 202210433198.7

(51) Int. Cl.
*H01Q 1/22* (2006.01)
*H01Q 21/06* (2006.01)
(Continued)

(52) U.S. Cl.
CPC ............... *H01Q 1/22* (2013.01); *H01Q 1/243* (2013.01); *H01Q 1/36* (2013.01); *H01Q 21/00* (2013.01); *H01Q 21/06* (2013.01)

(58) Field of Classification Search
CPC .......... H01Q 1/22; H01Q 21/06; H01Q 1/243; H01Q 1/36; H01Q 21/00
(Continued)

(56) References Cited

U.S. PATENT DOCUMENTS 9,153,855 B2 * 10/2015 Yamaguchi .......... H01Q 1/2283
10,326,196 B2 * 6/2019 Kim ......................... H01Q 1/22
(Continued)

FOREIGN PATENT DOCUMENTS

CN 103119854 A 5/2013
CN 203481369 U 3/2014
(Continued)

OTHER PUBLICATIONS

The First Office Action for Chinese Application No. 202210433198.7, dated May 31, 2022, 23 pages.
(Continued)

*Primary Examiner* — Hai V Tran
(74) *Attorney, Agent, or Firm* — Maier & Maier, PLLC

(57) ABSTRACT

A wireless communication structure, a display panel, and a wireless communication apparatus. The wireless communication structure includes a loop structure including a first connection end, a second connection end, and a coil body. At least a part of the coil body is connected between the first connection end and the second connection end; the antenna includes a millimeter-wave antenna unit configured to transmit and/or receive wireless signals in millimeter-wave band, and the millimeter-wave antenna unit is connected to the coil body. The millimeter-wave antenna unit is connected to the coil body of the loop structure, so that not only the loop structure and the antenna can be arranged in a limited space, but also a desired optical performance of the display screen can be ensured.

19 Claims, 29 Drawing Sheets

(51) Int. Cl.
*H01Q 1/24* (2006.01)
*H01Q 1/36* (2006.01)
*H01Q 21/00* (2006.01)

(58) Field of Classification Search
USPC .......................................................... 343/720
See application file for complete search history.

(56) References Cited

U.S. PATENT DOCUMENTS

| | | | | |
|---|---|---|---|---|
| 11,175,759 | B2* | 11/2021 | So | H01Q 1/243 |
| 11,329,369 | B2* | 5/2022 | Ryu | H01Q 7/00 |
| 2020/0052376 | A1* | 2/2020 | Zhu | H01Q 3/38 |
| 2021/0135340 | A1* | 5/2021 | Kim | H01Q 9/045 |

FOREIGN PATENT DOCUMENTS

| | | |
|---|---|---|
| CN | 104681988 A | 6/2015 |
| CN | 205282647 U | 6/2016 |
| CN | 205581826 U | 9/2016 |
| CN | 105990679 A | 10/2016 |
| CN | 106252828 A | 12/2016 |
| CN | 106329114 A | 1/2017 |
| CN | 205882163 U | 1/2017 |
| CN | 206163493 U | 5/2017 |
| CN | 206194944 U | 5/2017 |
| CN | 107302128 A | 10/2017 |
| CN | 207303337 U | 5/2018 |
| CN | 108172973 A | 6/2018 |
| CN | 207473255 U | 6/2018 |
| CN | 207572519 U | 7/2018 |
| CN | 207572520 U | 7/2018 |
| CN | 109066068 A | 12/2018 |
| CN | 109411873 A | 3/2019 |
| CN | 208738417 U | 4/2019 |
| CN | 110323531 A | 10/2019 |
| CN | 110931944 A | 3/2020 |
| CN | 110941113 A | 3/2020 |
| CN | 111052500 A | 4/2020 |
| CN | 210270842 U | 4/2020 |
| CN | 111788869 A | 10/2020 |
| CN | 111952733 A | 11/2020 |
| CN | 112350050 A | 2/2021 |
| CN | 212517503 U | 2/2021 |
| CN | 111541032 B | 8/2021 |
| CN | 114204286 A | 3/2022 |
| CN | 114269095 A | 4/2022 |
| CN | 114389013 A | 4/2022 |
| CN | 114530693 A | 5/2022 |
| CN | 114530694 A | 5/2022 |
| EP | 3823175 A1 | 5/2021 |
| JP | 2008301241 A | 12/2008 |
| JP | 2016001609 A | 1/2016 |
| KR | 10-2017-0082799 A | 7/2017 |
| KR | 102137082 B1 | 7/2020 |
| WO | 2013147823 A1 | 10/2013 |
| WO | 2018019080 A1 | 2/2018 |

OTHER PUBLICATIONS

The Notification to Grant Patent Right for Invention for Chinese Application No. 202210433198.7, dated Jun. 13, 2022, 3 pages.
Notice of Allowance, dated Sep. 1, 2022, in corresponding Korean Patent Application No. 10-2022-0101545; 4 pages.
International Search Report dated Nov. 30, 2022, in corresponding International Application No. PCT/CN2022/109239, 11 pages.
Office Action dated Nov. 15, 2022, in corresponding Japanese Application No. 2022-129447, 3 pages (with partial English translation).

* cited by examiner

WIRELESS COMMUNICATION STRUCTURE, DISPLAY PANEL AND WIRELESS COMMUNICATION APPARATUS

CROSS-REFERENCE TO RELATED APPLICATION

This application claims priority to Chinese Patent Application No. 202210433198.7, filed on Apr. 24, 2022, which is hereby incorporated by reference in its entirety.

TECHNICAL FIELD

The present application relates to the technical field of display devices, and particularly to a wireless communication structure, a display panel and a wireless communication apparatus.

BACKGROUND

Handheld wireless communication apparatuses (e.g. cell phones, smart watches, etc.) have more and more functions, and market requirements on apparatus appearance and wireless communication performance are becoming higher and higher. In the era of the 5th generation mobile communications (5G), since both the millimeter-wave (mm-wave) band and the non-millimeter wave (non-mm-wave) band are involved, types and numbers of modules used for wireless communication in a handheld wireless communication apparatuses are increasing. In addition, functions of near field communication (NFC) are becoming increasingly popular, so NFC coils have been provided in more and more handheld wireless communication apparatuses.

Meanwhile, screen-to-body ratios of the handheld wireless communication apparatus are becoming higher and higher. Therefore, since overall sizes of the apparatuses cannot be significantly increased, arranging wireless communication modules in display panels is a critical technology trend in foreseeable future. However, internal spaces of the display panels are limited and the display panels have optical requirements, so how to arrange the wireless communication modules in the display panels has become an important technical problem to be solved urgently.

SUMMARY

Embodiments of the present application provide a wireless communication structure, a display panel, and a wireless communication apparatus, in order to solve the problem of how to arrange a wireless communication module in a limited space and ensure a desired optical performance of the display panel.

Embodiments of a first aspect of the present application provides a wireless communication structure, including: a loop structure including a first connection end, a second connection end and a coil body, at least a part of the coil body being connected between the first connection end and the second connection end; an antenna including a plurality of millimeter-wave antenna units configured to transmit and/or receive wireless signals in millimeter-wave band, wherein at least two of the plurality of millimeter-wave antenna units form a millimeter-wave antenna array; the at least two millimeter-wave antenna units in the millimeter-wave antenna array are connected to the coil body, the coil body includes a first connection segment, a second connection segment and a third connection segment, the first connection segment is connected between the first connection end and the millimeter-wave antenna array, the second connection segment is connected between the millimeter-wave antenna array and the second connection end, and the third connection segment is connected between two adjacent millimeter-wave antenna units in the millimeter-wave antenna array.

According to an implementation of the first aspect of the present application, the antenna includes a plurality of millimeter-wave antenna arrays, the first connection segment is connected between one of the plurality of millimeter-wave antenna arrays and the first connection end, the second connection segment includes a first sub-segment and a second sub-segment, the first sub-segment is connected between two millimeter-wave antenna arrays, and the second sub-segment is connected between another one of the plurality of millimeter-wave antenna arrays and the second connection end.

According to any of the foregoing implementations of the first aspect of the present application, the millimeter-wave antenna unit includes a millimeter-wave wire; a line width of at least one of the first connection segment, the second connection segment and the third connection segment is configured to be not greater than a line width of the millimeter-wave wire.

According to any of the foregoing implementations of the first aspect of the present application, the antenna further includes a non-millimeter-wave antenna configured to transmit and/or receive wireless signals in non-millimeter-wave band, and the non-millimeter-wave antenna is connected to the coil body.

According to any of the foregoing implementations of the first aspect of the present application, at least one of the millimeter-wave antenna units is reused as a part of the non-millimeter-wave antenna.

According to any of the foregoing implementations of the first aspect of the present application, the coil body includes at least one blocking portion, and the at least one blocking portion is configured to allow signal currents transmitted and/or received by the loop structure to pass through and block wireless signal currents in non-millimeter-wave band transmitted and/or received by the non-millimeter-wave antenna.

According to any of the foregoing implementations of the first aspect of the present application, the at least one blocking portion includes at least two blocking portions, and the at least two blocking portions are spaced apart from one another on the coil body.

According to any of the foregoing implementations of the first aspect of the present application, the loop structure is configured to transmit and/or receive wireless signals in non-millimeter-wave band, and the coil body is configured to transmit and/or receive wireless signals in non-millimeter-wave band by coupling.

According to any of the foregoing implementations of the first aspect of the present application, the coil body includes a plurality of coils, and the millimeter-wave antenna unit is connected to at least one of the coils.

According to any of the foregoing implementations of the first aspect of the present application, the plurality of coils include an inner coil and an outer coil, each of the inner coil and the outer coil is connected between the first connection end and the second connection end, and the outer coil is located on a side of the inner coil away from a center of the wireless communication structure, the millimeter-wave antenna unit is connected to the outer coil, or, the millimeter-wave antenna unit is connected to the inner coil, and the antenna further includes a millimeter-wave feeding portion connected to the millimeter-wave antenna unit, and at least a part of the millimeter-wave feeding portion is disposed in a different layer from the outer coil.

According to any of the foregoing implementations of the first aspect of the present application, the plurality of coils are connected in series and are arranged in a spiral shape.

According to any of the foregoing implementations of the first aspect of the present application, the plurality of coils include a first coil and a second coil, each of the first coil and the second coil is connected between the first connection end and the second connection end, a part of the first coil is located on a side of the second coil away from the center of the wireless communication structure, a part of the second coil is located on a side of the first coil away from the center of the wireless communication structure, and the millimeter-wave antenna unit is connected to the first coil or the second coil.

According to any of the foregoing implementations of the first aspect of the present application, the plurality of coils include a direct-fed coil and a coupled coil, the direct-fed coil is connected between the first connection end and the second connection end, the coupled coil is coupled to the direct-fed coil, the coupled coil is disposed by the side of the direct-fed coil and spaced apart from the direct-fed coil, and the millimeter-wave antenna array is connected to the coupled coil or the direct-fed coil.

Embodiments of a second aspect of the present application provide a display panel including the wireless communication structure according to any one of the above embodiments of the first aspect.

According to an implementation of the second aspect of the present application, the display panel further includes a touch-control layer, where the touch-control layer includes a metal wiring in a grid pattern, and the loop structure and the antenna are located in the touch-control layer.

According to any of the foregoing implementations of the second aspect of the present application, the display panel includes a first area and a second area surrounding the first area, the first area is a display area, the second area includes a display area and/or a non-display area, and the loop structure is located in the second area, where the coil body is disposed in the second area and surrounds the first area.

Embodiments of a third aspect of the present application provide a wireless communication apparatus including the display panel according to any one of the above embodiments of the second aspect, where the antenna includes a plurality of millimeter-wave antenna arrays, and the wireless communication apparatus includes a plurality of circuit boards corresponding to the plurality of millimeter-wave antenna arrays respectively.

According to an implementation of the third aspect of the present application, the wireless communication apparatus further includes:

a first circuit board and a first transmission line disposed on the first circuit board, the first transmission line being in communication with the first connection end and/or the second connection end of the loop structure;

a second circuit board and a second transmission line disposed on the second circuit board, the second transmission line being in communication with the millimeter-wave antenna unit;

where the first circuit board is integrated with the second circuit board.

According to any of the foregoing implementations of the third aspect of the present application, the wireless communication apparatus includes a first connection socket disposed on the first circuit board, and the first transmission line is connected to the first connection socket;

the wireless communication apparatus includes a second connection socket disposed on the second circuit board, and the second transmission line is connected to the second connection socket;

the first connection socket is integrated with the second connection socket.

According to any of the foregoing implementations of the third aspect of the present application, the antenna further includes a non-millimeter-wave antenna configured to transmit and/or receive wireless signals in non-millimeter-wave band, and the wireless communication apparatus further includes:

a third circuit board and a third transmission line disposed on the third circuit board, the third transmission line being in communication with the non-millimeter-wave antenna, where the first circuit board, the second circuit board and the third circuit board are formed integrally; and a third connection socket disposed on the third circuit board, the third transmission line being connected to the third connection socket, where the first connection socket, the second connection socket and the third connection socket are formed integrally.

In the wireless communication structure provided by the present application, the wireless communication structure includes the loop structure and the antenna. The loop structure includes the first connection end, the second connection end and the coil body, and the loop structure is configured to transmit and/or receive wireless signals on the coil body through the first connection end and the second connection end. The antenna includes the millimeter-wave antenna unit. The millimeter-wave antenna unit is configured to transmit and/or receive wireless signals in millimeter-wave band. The millimeter-wave antenna unit is connected to the coil body, so that at least a part of the coil body can transmit and/or receive wireless signals of the loop structure and wireless signals in millimeter-wave band. The overall area occupied by the loop structure and the antenna can be reduced, so that a plurality of modules used for wireless communication can be arranged in a limited space. In addition, at least one loop structure is connected to the millimeter-wave antenna unit, which can ensure a desired optical performance of the display screen, and simply the patterning process of the antenna, thereby improving the manufacturing efficiency of the wireless communication module and reducing the manufacturing cost.

BRIEF DESCRIPTION OF THE DRAWINGS

Features, objects and advantages of the present application will be clearer from the detailed description of following reference drawings of non-limited embodiments. The same or similar reference numerals and/or letters mean the same or similar features.

DETAILED DESCRIPTION

Figure 1:
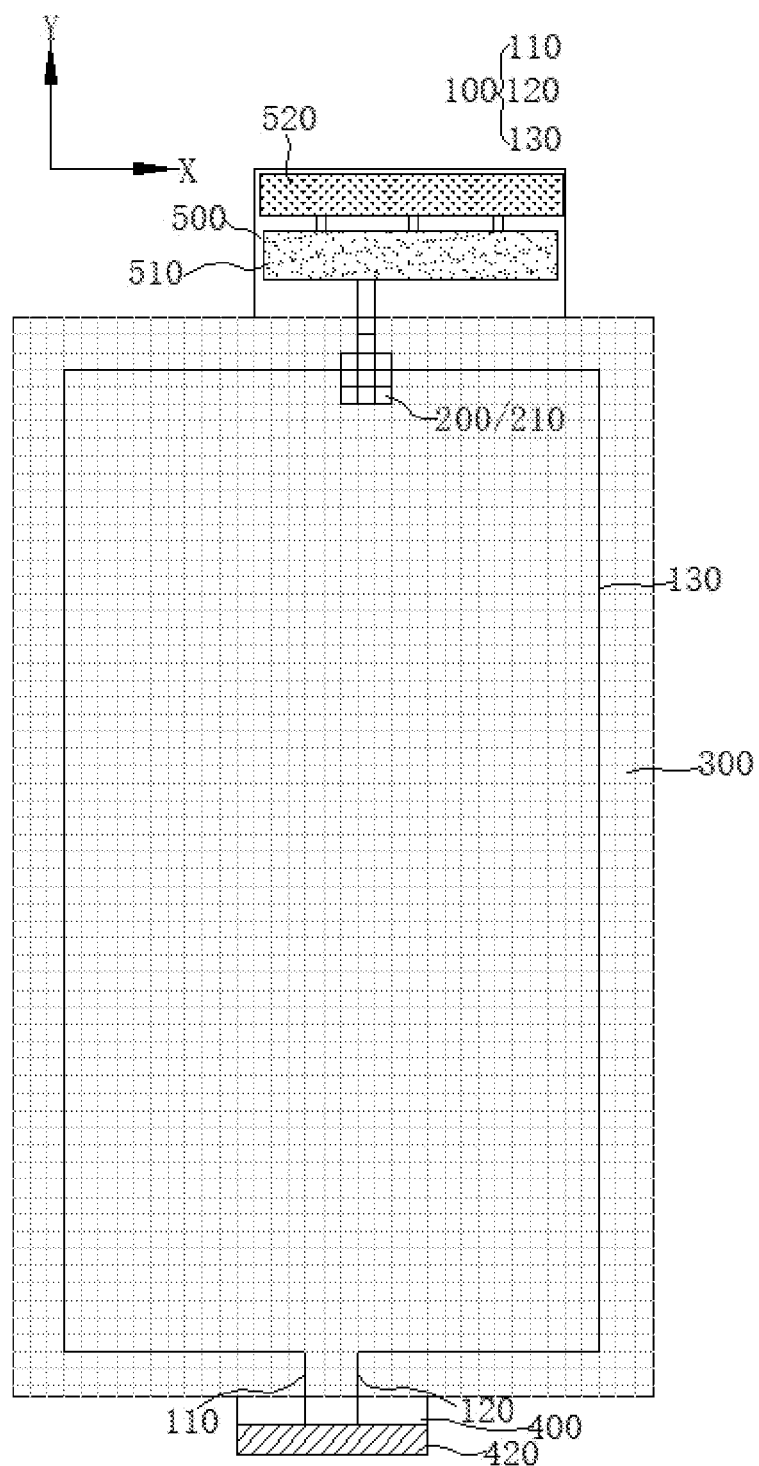
FIG. 1 is a schematic structural view of a display panel according to a first embodiment of a first aspect of the present application.

Features and exemplary embodiments of various aspects of the present application are described in detail below. In the following detailed description, numerous specific details are presented to provide a thorough understanding of the present application. However, it will be apparent for those skilled in the art that the present application may be implemented without some of these specific details. The following description of the embodiments is merely for providing a better understanding of the present application by illustrating examples of the present application. In the drawings and the following description, at least some of well know structures and techniques have not been shown to avoid unnecessary obscurity of the present application. In addition, size of some structures may be exaggerates for clarity. Furthermore, the features, structures, or characteristics described below may be combined in one or more embodiments by any suitable manner.

In the description of the present application, it is noted that, unless otherwise specified, the meaning of "a plurality" is two or more; the terms "upper", "lower", "left", "right", "inner", "outer", and the like indicate orientations or positional relationships merely to facilitate and simplify description of the present application, and do not indicate or imply that the devices or elements referred to must have a particular orientation, be constructed and operated in a particular orientation, and thus should not be construed as limiting the present application. In addition, terms "first", "second", and the like are merely used for the purpose of description and should not be interpreted as indicating or implying relative importance.

The directional terms appearing in the following description are referred to directions shown in the drawings and do not limit the specific structures of the present application. In the description of the present application, it should be further noted that, unless otherwise clearly specified and limited, the terms "mounted" and "connected" should be understood in a broad sense, for example, a connection may refer to a fixed, a detachable or an integrated connection (which may be a direct connection or an indirect connection). For those with ordinary skills in the art, the specific meaning of the terms mentioned above in the present application can be understood in accordance with specific contexts.

With the development of display technology and wireless communication technology, screen-to-body ratios of display devices in apparatuses with wireless communication functions are continually increasing, and types and numbers of modules used to achieve wireless communication in the apparatuses are also increasing. For example, in the era of 5th generation mobile communications, spectrum of wireless communication cover both the millimeter wave band and the non-millimeter wave band. Therefore, a wireless communication apparatus with 5G millimeter wave functions, such as a mobile phone, not only may be provided with a first type antenna that can be used for the millimeter wave band, but also may be provided with a wireless communication module that can be used for the non-millimeter wave band (such as those used for 5G, 4G, a wireless local area network (WLAN), Bluetooth (BT), a global navigation satellite system (GNSS), etc). At the same time, near field communication (NFC) is also becoming increasingly popular, and therefore, more and more mobile phones have NFC coils provided therein.

However, the higher the screen-to-body ratio of the display device in the wireless communication apparatus is, the more likely it is to limit the positions where the wireless communication modules can be positioned, and the wireless communication modules tend to be more likely to be obscured in use (for example, the apparatus is being held by hand or placed on a metal table), which results in that the performance of wireless communication module deteriorates significantly, and which affects the users' wireless experience. In view of the above, it is contemplated that the wireless communication modules are integrated in the display device of the wireless communication apparatus, for example, in a design of Antenna-on-Display (AoD), which has become a possible direction of development for wireless communication modules in wireless communication apparatuses.

Figure 37:
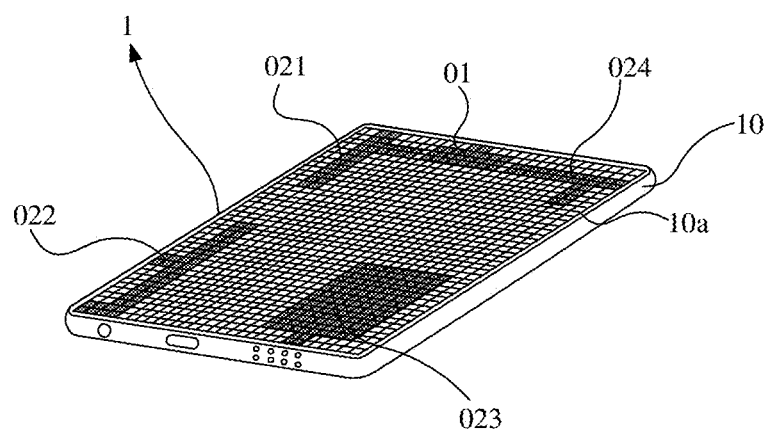
FIG. 37 is a schematic structural view of a wireless communication apparatus in the related art.

In some embodiments, with reference to FIG. 37, a wireless communication apparatus 1 being a cell phone is taken as an example. The wireless communication modules integrated in a display device 10 of the cell phone may include a 5G millimeter-wave antenna 01, a WiFi/BT antenna 021, a LTE (long term evolution) antenna 022, an NFC coil 023 and a 5G non-millimeter-wave antenna 024. Generally, the 5G millimeter-wave antenna 01, the WiFi/BT antenna 021, the LTE antenna 022, the NFC coil 023 and the 5G non-millimeter-wave antenna 024 are independently arranged in the display device 10. However, an internal space of the display device 10 is limited. How to dispose the wireless communication modules in the limited space while ensuring desired optical and touch-control effects of the display panel have become an urgent technical problem to be solved.

In order to solve the above problem, the present application is presented. For a better understanding of the present application, the wireless communication structure, the display panel and the wireless communication apparatus of the embodiments of the present application are described in detail below with reference to FIG. 1 to FIG. 36.

Reference is made to FIG. 1, which is a structural view of a display panel according to a first embodiment of the present application.

As illustrated in FIG. 1, the display panel provided by an embodiment of the present application includes a wireless communication structure. There are various ways of arranging the wireless communication structure. As illustrated in FIG. 1, the wireless communication structure provided by an embodiment of the present application includes a loop structure 100 and antenna 200. The loop structure 100 includes a first connection end 110, a second connection end 120 and a coil body 130. At least a part of the coil body 130 is connected between the first connection end 110 and the second connection end 120. The antenna 200 includes a millimeter-wave antenna unit 210 configured to transmit and/or receive wireless signals in millimeter-wave band. The millimeter-wave antenna unit 210 is connected to the coil body 130 of at least one loop structure 100.

The millimeter-wave antenna unit 210 configured to transmit and/or receive wireless signals in millimeter-wave band refers to the millimeter-wave antenna unit 210 configured to transmit and/or receive wireless signals in millimeter-wave band, that is, the "transmit and/or receive" herein refers to transmit and/or receive. The millimeter-wave antenna unit 210 includes a millimeter-wave feeding portion and a millimeter radiating portion. Optionally, the millimeter-wave feeding portion and/or the millimeter radiating portion are connected to the coil body 130 of at least one loop structure 100.

In the wireless communication structure provided by an embodiment of the present application, the wireless communication structure includes at least one loop structure 100 and the antenna 200. The loop structure 100 is configured to transmit and/or receive signals on the coil body 130 through the first connection end 110 and the second connection end 120. The antenna 200 includes the millimeter-wave antenna unit 210 configured to transmit and/or receive wireless signals in millimeter-wave band. The millimeter-wave antenna unit 210 is connected to the coil body 130 of at least one loop structure 100, which can not only reduce an overall area occupied by the loop structure 100 and the antenna 200, so that a plurality of wireless communication modules can be arranged in a limited space. In addition, at least one loop structure 100 and the millimeter-wave antenna unit 210 of the antenna 200 are connected to each other, which can ensure a desired optical performance of the display screen and simplify patterning process of the antenna, thereby improving the manufacturing efficiency and reducing the manufacturing cost of the wireless communication module.

As an optional embodiment, with further reference to FIG. 1, when the wireless communication structure is used for the display panel, the display panel further includes a touch-control layer 300 including a metal wiring in a grid pattern, which are illustrated as light-colored grid lines in FIG. 1. When the loop structure 100 and the antenna 200 are arranged in the touch-control layer 300, a part of the metal wiring for connecting at least one loop structure 100 and the millimeter-wave antenna unit 210 do not need to be cut in a connection direction, so the number of cutting points of the metal wiring in a grid pattern can be reduced. The issues of increased touch-control blind spots, deterioration of touch-control performance and degraded experience caused by the wireless communication structure being arranged in the touch layer 300 can be improved, so as to ensure a desired touch-control performance of the display screen. In addition, a connection part between at least one loop structure 100 and the millimeter-wave antenna unit 210 does not need to be cut in the connection direction, so that patterns of the metal wiring in a grid pattern in different areas tend to be uniform, and thus an optical effect of the display panel can be improved.

The coil body 130 are is a loop coil, which may be arranged in various manners. For example, the loop structure 100 includes at least one of a NFC coil, a wireless power charging (WPC) coil, a LTE coils, a GNSS coil, a WLAN coil, a BT coil, and a frequency modulation (FM) coil and the like. The NFC coil, the WPC coil, the LTE coil, the GNSS coil, the WLAN coil, the BT coil, the FM coil and the like can each be arranged as a loop coil, so as to facilitate the connection of the millimeter-wave antenna unit 210 therewith.

Optionally, the loop structure 100 includes at least one of the NFC coil and the WPC coil. The loop structure 100 including the NFC coil and/or the WPC coil is typically large in size. For example, the loop structure 100 including the NFC coil and/or the WPC coil is arranged close to and around the edges of the display panel, so as to facilitate the series connection of the millimeter-wave antenna unit 210 in the loop structure 100 including the NFC coil and/or the WPC coil. In addition, the millimeter-wave antenna unit 210 can be arranged closer to the edges of the display panel, so that the deterioration of the optical and touch-control effects of the display panel caused by the millimeter-wave antenna unit 210 can be insignificant, and the feeding path of the millimeter-wave antenna unit 210 can be shorter. Therefore, feeding loss can be lower, so as to achieve a desired radiation performance of the millimeter-wave antenna unit 210.

Figure 2:
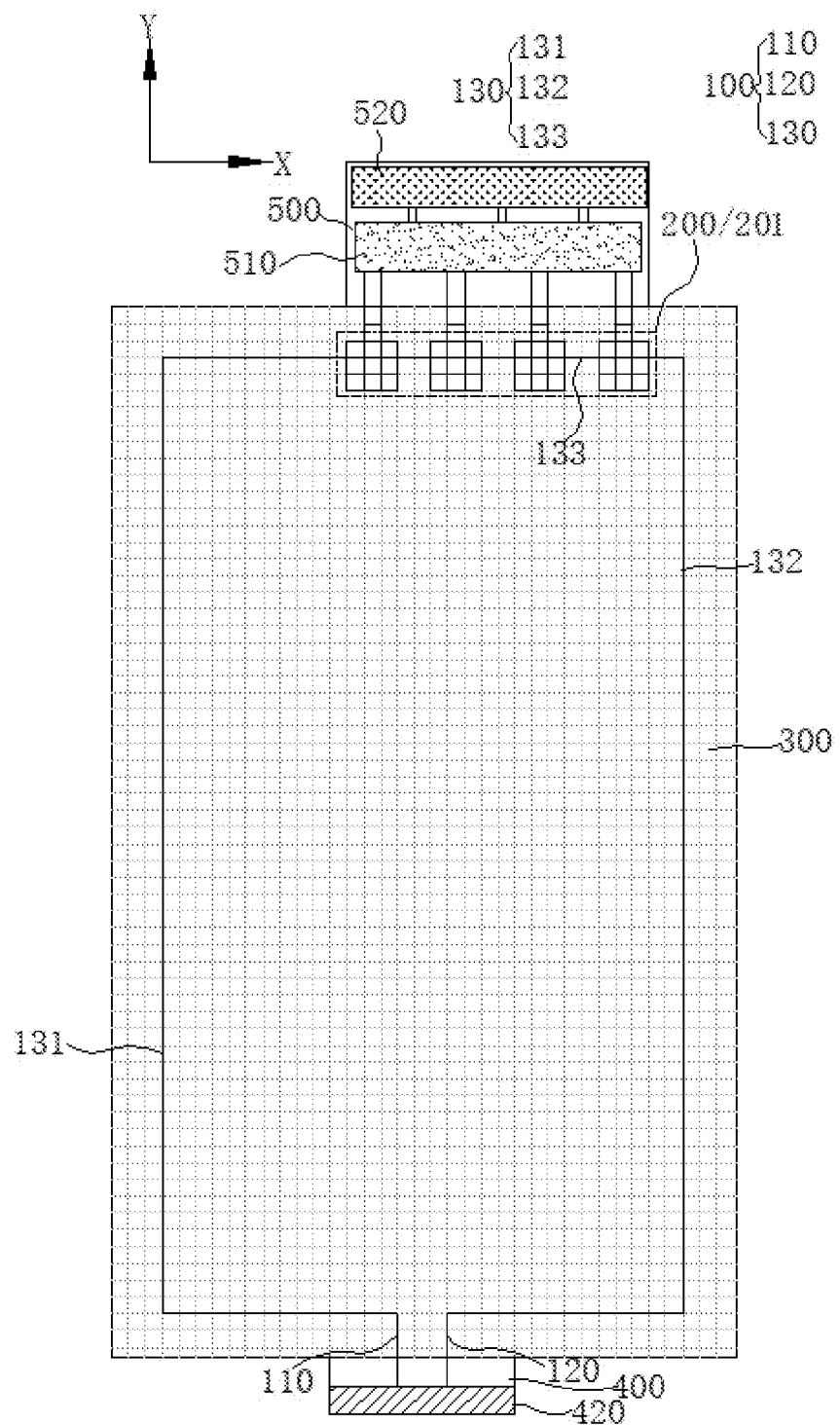
FIG. 2 is a schematic structural view of a display panel according to a second embodiment of a first aspect of the present application.

Reference is made to FIG. 2, which is schematic structural view of a display panel according to a second embodiment of the first aspect. The structure of the embodiment illustrated in FIG. 2 is partially the same as the structure of the embodiment illustrated in FIG. 1, which will not be described in detail here, and differences therebetween will be described below. In addition, the following description herein will be directed to differences between various embodiments associated with respective drawings.

As shown in FIG. 2, the antenna 200 includes a plurality of millimeter-wave antenna units 210. At least two of the millimeter-wave antenna units 210 form a millimeter-wave antenna array 201. At least one millimeter-wave antenna unit 210 in the millimeter-wave antenna array 201 is connected to the coil body 130. In FIG. 2, the position of the millimeter-wave antenna array 201 is indicated by a dashed-dotted line. The dashed-line frame does not limit the structure of the wireless communication structure of the embodiments of the present application.

As shown in FIG. 2, each millimeter-wave antenna unit 210 in the millimeter-wave antenna array 201 is connected to the coil body 130. The coil body 130 connected to the millimeter-wave antenna array 201 includes a first connection segment 131, a second connection segment 132 and a third connection segment 133. The first connection segment 131 is connected between the first connection end 110 and the millimeter-wave antenna array 201. The second connection segment 132 is connected between the millimeter-wave antenna array 201 and the second connection end 120. The third connection segment 133 is connected between two adjacent millimeter-wave antenna units 210 in a same millimeter-wave antenna array 201. Through the first connection segment 131 and the second connection segment 132, the millimeter-wave antenna array 201 can be connected between the first connection end 110 and the second connection end 120. The third connection segment 133 is connected between two adjacent millimeter-wave antenna units 210 in a same millimeter-wave antenna array 201, which can reduce the overall area occupied by the loop structure 100 and the antenna 200, and can further simplify a pattern of the loop structure 100 and the antenna 200.

Figure 3:
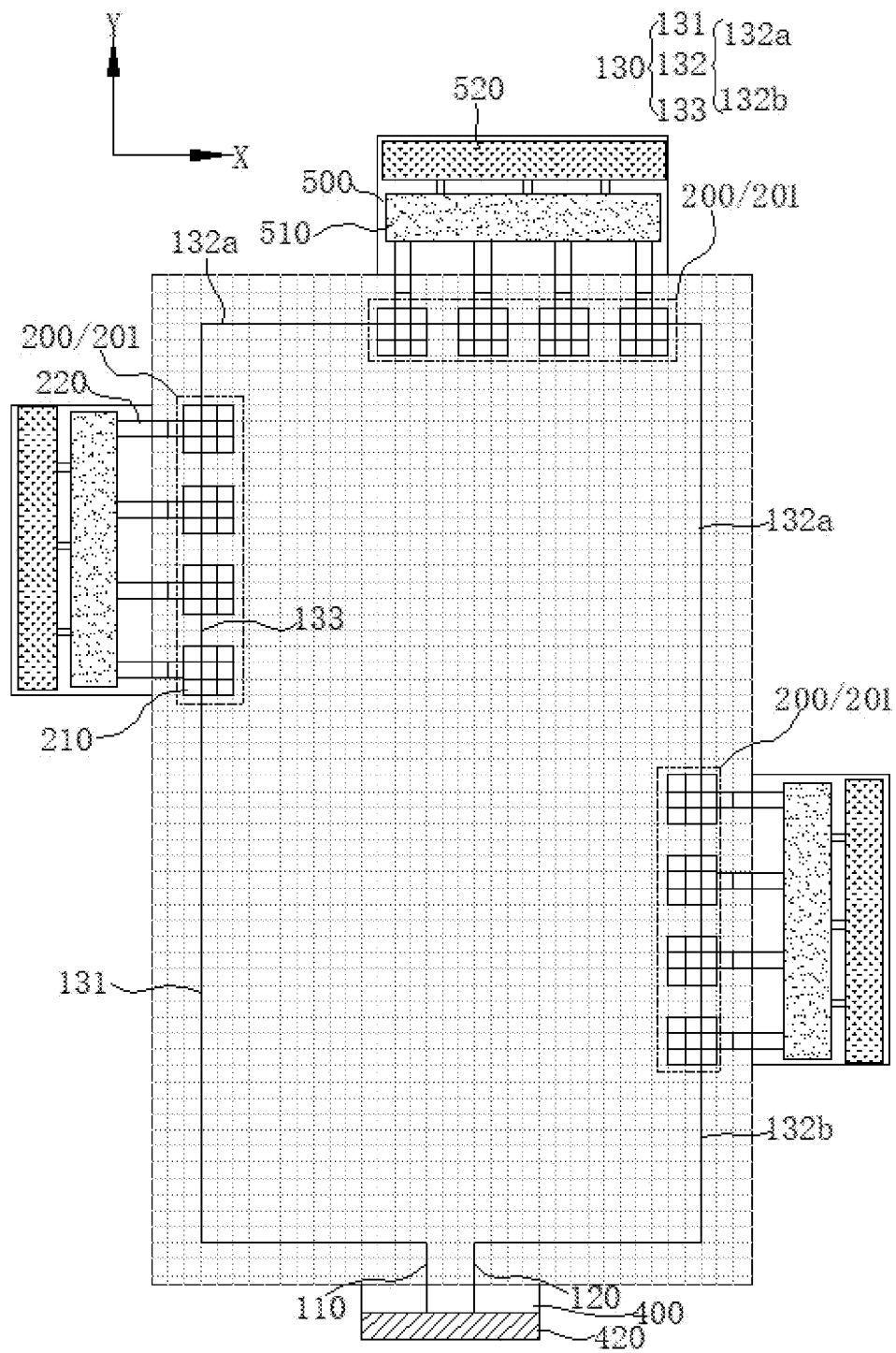
FIG. 3 is a schematic structural view of a display panel according to a third embodiment of a first aspect of the present application.

Reference is made to FIG. 3, which is a structural view of a display panel according to a third embodiment of the present application.

Optionally, as shown in FIG. 3, the antenna 200 includes a plurality of millimeter-wave antenna arrays 201. The first connection segment 131 is connected between one of the millimeter-wave antenna arrays 201 and the first connection end 110. The second connection segment 132 includes a first sub-segment 132a and a second sub-segment 132b. The first sub-segment 132a is connected between two adjacent millimeter-wave antenna arrays 201, and the second sub-segment 132b is connected between another millimeter-wave antenna array 201 and the second connection end 120. The first sub-segment 132a is configured to realize the connection between the two adjacent millimeter-wave antenna arrays 201, and the second sub-segment 132b is configured to realize the connection between the millimeter-wave antenna array 201 and the second connection end 120. As such, the second connection segment 132 is divided into a plurality of segments. A part of the second connection segment 132 (for example, the first sub-segment 132a) is for connecting the two adjacent millimeter-wave antenna arrays 201, and a part of the second connection segment 132 (for example, the second sub-segment 132b) is for connecting the millimeter-wave antenna array 201 and the second connection end 120.

As shown in FIG. 3, the antenna 200 includes three millimeter-wave antenna arrays 201. Two of the millimeter-wave antenna arrays 201 are arranged as opposite to each other along a first direction X, that is, the two millimeter-wave antenna arrays 201 are correspondingly arranged on the two opposite edges of the display panel along the first direction X, and the two millimeter-wave antenna arrays 201 are not necessarily to be directly opposite to each other. The other millimeter-wave antenna array 201 is arranged as opposite to the first connection end 110 and the second connection end 120 along a second direction Y, so that the first connection end 110, the second connection end 120 and the three millimeter-wave antenna arrays 201 are distributed around the circumference of the display panel in a spaced manner, and the millimeter-wave antenna arrays 201 are distributed in different positions of the display panel. When a user uses different gestures to operate the display panel, there is always a millimeter-wave antenna array 201 that is in a position that is not blocked by the user, so the stability of the millimeter-wave antenna array 201 for transmitting and/or receiving wireless signals can be improved, and a desired user wireless experience can be ensured.

Figure 4:
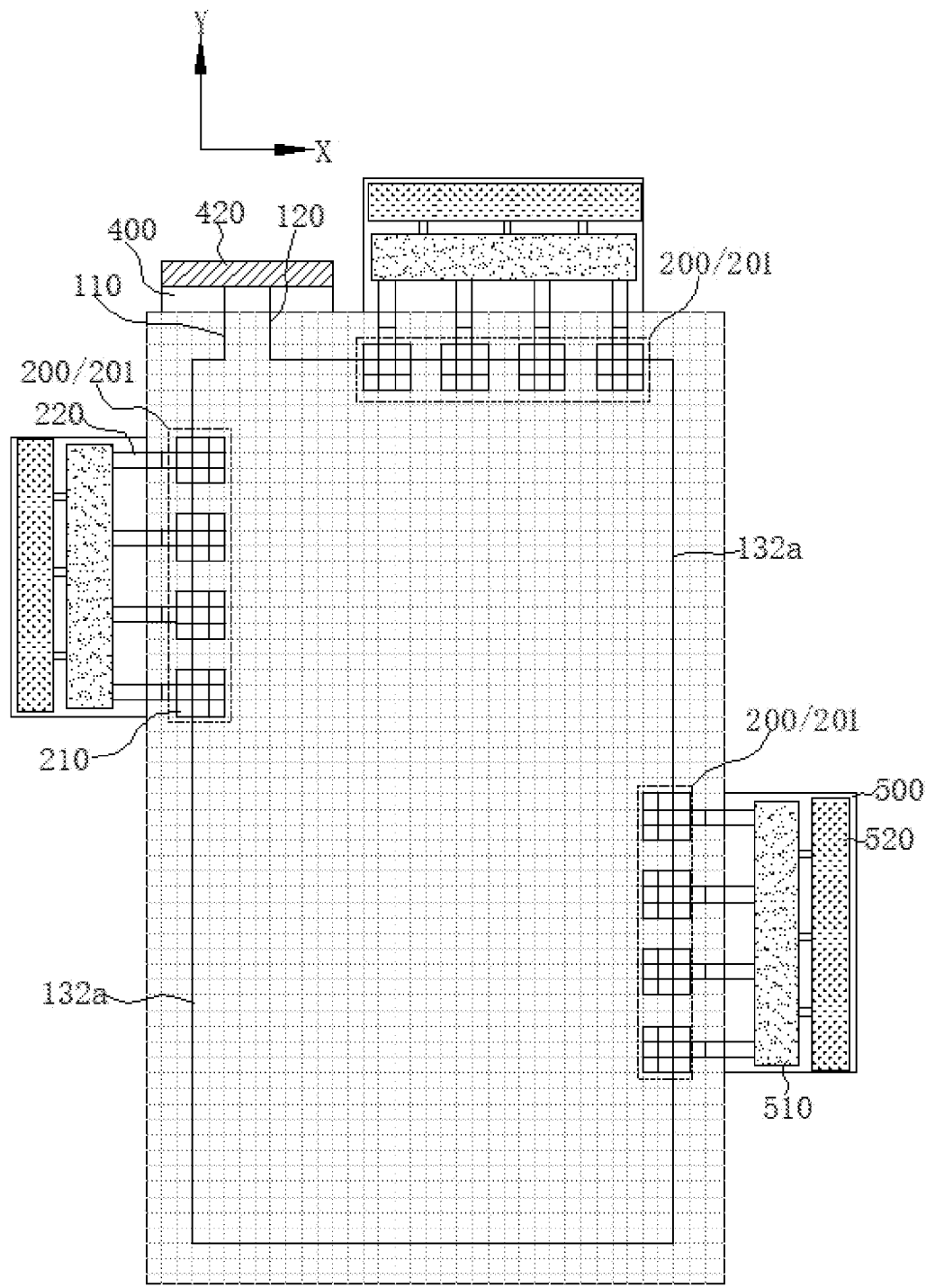
FIG. 4 is a schematic structural view of a display panel according to a fourth embodiment of a first aspect of the present application.

In some other optional embodiments, as shown in FIG. 4, the first connection end 110 and the second connection end 120 may be arranged in a spaced manner from a millimeter-wave antenna array 201 along the first direction X, that is, the first connection end 110 and the second connection end 120 are arranged by the side of one of the millimeter-wave antenna arrays 201.

Optionally, the shape of the millimeter-wave antenna unit 210 may be set in various manners. For example, the shape of the millimeter-wave antenna unit 210 may be a square, a diamond, or the like.

In any of the above embodiments, the first connection segment 131, the second connection segment 132 and the third connection segment 133 can be arranged in various manners. For example, the first connection segment 131 may include one wire, or the first connection segment 131 may include a plurality of wires arranged side by side, or the first connection segment 131 may include a plurality of wires arranged side by side and a bridge wire connecting the plurality of wires arranged side by side. Similarly, the second connection segment 132 and/or the third connection segment 133 may comprise one wire, or the second connection segment 132 and/or the third connection segment 133 may include a plurality of wires arranged side by side, or the second connection segment 132 and/or the third connection segment 133 may include a plurality of wires arranged side by side and a bridge wire connecting the plurality of wires arranged side by side.

Figure 5:
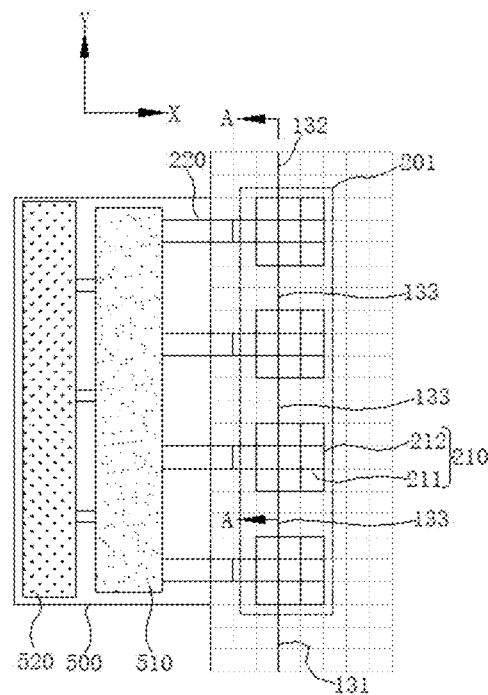
FIG. 5 is a partial magnified structural view of FIG. 4.
Figure 6:
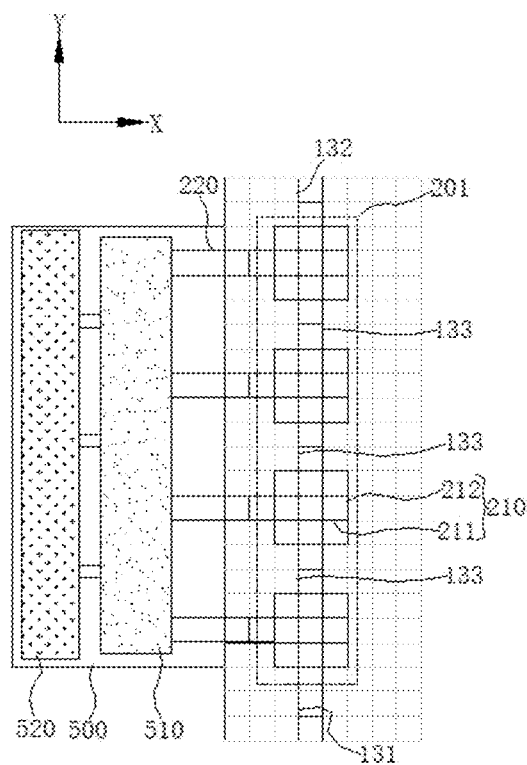
FIG. 6 is a partial magnified structural view of a millimeter-wave antenna unit in a fifth embodiment.

As shown in FIG. 5, the third connection segment 133 between two adjacent millimeter-wave antenna units 210 includes one wire. Alternatively, as shown in FIG. 6, the third connection segment 133 between two adjacent millimeter-wave antenna units 210 includes two or more wires.

An impedance of a conductor includes a resistance and a reactance.

Resistance=ρ (L/A), where ρ is a resistivity of the conductor, L is a length of the conductor, and A is a current distribution area corresponding to currents applied to the conductor. Given that intrinsic electrical and structural size parameters of the conductor are of constant values, when a signal frequency increases, a distribution area of a current in the conductor will decrease due to the skin effect (that is, the higher the frequency of the signal is, the more likely that the corresponding currents are concentrated in a thin layer near a surface of the conductor), that is, A will decrease, resulting in an increase in the resistance.

Since reactance=inductive reactance–capacitive reactance, the reactance and the inductive reactance are positively correlated. Inductive reactance=jwL, where w is an angular frequency and w=2πf, where f is a frequency, and L is an inductance. Therefore, when the signal frequency increases, the inductive reactance will increase. In addition, due to the skin effect mentioned above, an inductance faced by the high-frequency signal will also increase, which further increases the inductive reactance.

To sum up, when a frequency of a signal increases, flowing of a current corresponding to the signal on the conductor will be blocked. Therefore, under conditions of a same conductor, a current corresponding to a high-frequency signal is more liable to be blocked than a current corresponding to a low-frequency signal. In addition, when a width of the conductor is reduced, the inductance of the conductor will increase, and therefore, the inductive reactance will further increase, so that flowing of the current corresponding to the high-frequency signal will be further blocked. Therefore, by adjusting the size of the conductor, currents corresponding to signals of different frequencies can be desirably blocked or allowed to pass through.

When the loop structure 100 includes the NFC coil, a frequency band of wireless signals in millimeter-wave band transmitted and/or received by the millimeter-wave antenna unit 210 is higher than the NFC frequency band. Therefore, under conditions of a same conductor, the millimeter-wave currents corresponding to the frequency band of the wireless signals in the millimeter-wave band are more likely to be blocked and less likely to be allowed to pass through compared to the currents corresponding to the NFC frequency band. Therefore, by adjusting the size of the coil body 130, the millimeter-wave currents can be desirably blocked and the currents corresponding to the NFC frequency band can be desirably allowed to pass through.

The line width of at least part of at least one of the first connection segment 131, the second connection segment 132 and the third connection segment 133 is less than the width of the millimeter-wave antenna unit 210. Optionally, the millimeter-wave antenna unit 210 includes a millimeter-wave wire. The line width of at least part of at least one of the first connection segment 131, the second connection segment 132 and the third connection segment 133 is not greater than the width of the millimeter-wave wire in the millimeter-wave antenna unit 210.

For example, the line width of at least part of the first connection segment 131 is not greater than the width of the millimeter-wave antenna unit. When the millimeter-wave antenna unit 210 is in a block shape, the millimeter-wave antenna unit 210 can be understood as including one millimeter-wave wire. When the millimeter-wave antenna unit 210 includes a plurality of millimeter-wave wires, the line width of at least part of the first connection segment 131 being less than the width of the millimeter-wave antenna unit 210 means that the line width of at least part of the first connection segment 131 is less than the sum of the widths of the plurality of millimeter-wave wires in the millimeter-wave antenna unit 210.

In an embodiment of the present application, when the line width of at least part of the first connection segment 131 is not greater than the width of the millimeter-wave wire in the millimeter-wave antenna unit 210, the line width of the first connection segment 131 is small, so the first connection segment 131 has a high impedance. As described above, the wireless signals in millimeter-wave band transmitted and/or received by the millimeter-wave antenna unit 210 are in a high frequency band, so that the millimeter-wave currents corresponding to the frequency band of the wireless signals in millimeter-wave band transmitted and/or received by the millimeter-wave antenna unit 210 cannot pass through the first connection segment 131. Therefore, the first connection segment 131 has a desired filtering and blocking effect on the millimeter-wave currents. However, the first connection segment 131 can have a desired passing effect on non-millimeter-wave current corresponding to the non-millimeter-wave frequency bands in the era of the 5th generation mobile communications (5G) and its previous generations mobile communications, WLAN or Bluetooth, and the first connection segment 131 can also have a desired passing effect on non-millimeter-wave current corresponding to the NFC frequency band. Therefore, in an embodiment of the present application, the current of the loop structure 100 can desirably pass through the first connection segment 131, while the millimeter-wave currents are significantly blocked by the first connection segment 131.

The millimeter-wave currents refer to the currents corresponding to the frequency band of the wireless signals in millimeter-wave band transmitted and/or received by the millimeter-wave antenna unit 210. The wireless signal currents refer to the currents corresponding to the frequency band of the wireless signals transmitted and/or received by the loop structure 100.

The configuration of the line width of at least part of the second connection segment 132 and/or the third connection segment 133 being not greater than the width of the millimeter-wave antenna unit 210 and its beneficial effects are the same as above, and will not be repeated here.

Optionally, the line widths of the first connection segment 131, the second connection segment 132, and the third connection segment 133 are each set to be not greater than the line width of the millimeter-wave wire. The millimeter-wave currents can be significantly blocked by the first connection segment 131, the second connection segment 132, and the third connection segment 133, so as to desirably ensure the independence of each millimeter-wave antenna unit 210 in the millimeter-wave antenna array 201, and ensure a desired performance of the millimeter-wave antenna array 201.

Optionally, when the line width of at least part of the third connection segment 133 is not greater than the width of the millimeter-wave antenna unit 210, as shown in FIG. 5, when the third connection segment 133 between two adjacent millimeter-wave antenna units 210 includes one wire, the line width of one wire in the third connection segment 133 is not greater than the sum of the line widths of the millimeter-wave wires in the millimeter-wave antenna unit 210 in the same extension direction as the third connection segment 133. As shown in FIG. 6, when the third connection segment 133 between two adjacent millimeter-wave antenna units 210 includes a plurality of wires, the sum of the line widths of the plurality of wires in the third connection segment 133 is not greater than the sum of the line widths of the millimeter-wave wires in the millimeter-wave antenna unit 210 in the same extension direction as the third connection segment 133. As shown in FIG. 5 and FIG. 6, when the first direction X is perpendicular to the second direction Y, and the third connection segment 133 extends along the second direction Y, a line width direction of the third connection segment 133 is the first direction X, and the width direction of the millimeter-wave wire is also the first direction X. In some other embodiments, when the third connection segment 133 extends along the first direction X, the line width direction of the third connection segment 133 is the second direction Y.

In an embodiment of the present application, when the sum of the line widths of the wires in the third connection segment 133 is not greater than the sum of the line widths of the millimeter-wave wires in the millimeter-wave antenna unit 210 in the same extension direction as the third connection segment 133, that is, the width of the third connection segment 133 is small, the third connection segment 133 has a high impedance. Therefore, the third connection segment 133 has a desired filtering and blocking effect on the currents in the millimeter-wave band. However, the third connection segment 133 can have a desired passing effect on non-millimeter-wave current corresponding to the non-millimeter-wave frequency bands in the era of the 5th generation mobile communications (5G) and its previous generations mobile communications, WLAN, BT or GNSS, and the third connection segment 133 can also have a desired passing effect on non-millimeter-wave currents corresponding to the NFC frequency band. Therefore, in an embodiment of the present application, the current of the loop structure 100 can desirably pass through the third connection segment 133, while the millimeter-wave currents are significantly blocked by the third connection segment 133. However, the millimeter-wave currents can desirably flow in the millimeter-wave antenna unit 210, which can desirably ensure the independence of each millimeter-wave antenna unit 210 in the millimeter-wave antenna array 201 and ensure a desired performance of the millimeter-wave antenna array 201.

Optionally, the sum of the line widths of the wires in the second connection segment 132 is not greater than the sum of the line widths of the millimeter-wave wires in the millimeter-wave antenna unit 210 in the same extension direction as the second connection segment 132. As shown in FIG. 2 to FIG. 4, when the second connection segment 132 extends along the first direction X, the line width direction of the second connection segment 132 is the second direction Y, and when the second connection segment 132 extends along the second direction Y, the line width direction of the second connection segment 132 is the first direction X.

As mentioned above, the line width of the second connection segment 132 is small, which can desirably block the millimeter-wave currents, and desirably allow the currents corresponding to the non-millimeter-wave band and the NFC frequency band to pass through. As such, the second connection segment 132 can desirably block the currents corresponding to the millimeter-wave band and ensure a desired performance of the millimeter-wave antenna array 201 and a desired performance of the millimeter-wave antenna unit 210, without much affecting the currents corresponding to other non-millimeter-wave band and the NFC frequency band.

Optionally, the sum of the line widths of the wires in the first connection segment 131 is not greater than the sum of the line widths of the millimeter-wave wires in the millimeter-wave antenna unit 210 in the same extension direction as the first connection segment 131. As shown in FIG. 2 to FIG. 4, when the first connection segment 131 extends along the first direction X, the line width direction of the first connection segment 131 is the second direction Y, and when the first connection segment 131 extends along the second direction Y, the line width direction of the first connection segment 131 is the first direction X.

As mentioned above, the line width of the first connection segment 131 is small, which can desirably block the millimeter-wave currents, and desirably allow the currents corresponding to the non-millimeter-wave band and the NFC frequency band to pass through. As such, the first connection segment 131 can desirably block the currents corresponding to the millimeter-wave band and ensure a desired performance of the millimeter-wave antenna array 201 and a desired performance of the millimeter-wave antenna unit 210, without much affecting the currents corresponding to other non-millimeter-wave band and the NFC frequency band.

In addition, in an embodiment of the present application, the antenna 200 includes a plurality of millimeter-wave antenna units 210. The plurality of millimeter-wave antenna units 210 are arranged adjacently or in an array to form the millimeter-wave antenna array 201, which can improve the antenna gain and compensate for a large radiation path loss, and can achieve an effect of beam scanning to cover a wide space so as to reduce wireless communication blind spots and achieve a desired user wireless experience.

There are various manners of setting the shape of the third connection segment 133. The third connection segment 133 may be in the shape of a straight line, that is, the third connection segment 133 extends in a same direction. Alternatively, the third connection segment 133 may be in the shape of a polyline, that is, the third connection segment 133 extends along a bending path. Alternatively, the third connection segment 133 may be in the shape of an arc. Alternatively, the third connection segment 133 is formed by a combination of at least two of a straight line, a polyline, and an arc.

Optionally, when the millimeter-wave antenna array 201 includes a plurality of millimeter-wave antenna units 210, in the direction from the first connection end 110 to the second connection end 120, the first connection segment 131 is connected to a first antenna unit among the plurality of millimeter-wave antenna units 210, or the second connection segment 132 is connected to a last antenna unit among the plurality of millimeter-wave antenna units 210.

For example, as shown in FIG. 5 and FIG. 6, the millimeter-wave antenna array 201 includes four millimeter-wave antenna units 210. The four millimeter-wave antenna units 210 are respectively the first antenna unit, a second antenna unit, a third antenna unit and a fourth antenna unit along their arrangement direction (the second direction Y). On an extension path from the first connection end 110 to the second connection end 120, the first antenna unit is positioned on a side, in the four millimeter-wave antenna units 210, close to the first connection end 110, and the fourth antenna unit is positioned on a side, in the four millimeter-wave antenna units 210, close to the second connection end 120. As such, and the first connection segment 131 is connected between the first antenna unit and the first connection end 110. The fourth antenna unit is the last antenna unit, and the second connection segment 132 is connected between the fourth antenna unit and the second connection end 120.

Optionally, the third connection segment 133 is connected between the first antenna unit and the second antenna unit, the third connection segment 133 is connected between the second antenna unit and the third antenna unit, and the third connection segment 133 is connected between the third antenna unit and the fourth antenna unit.

Figure 7:
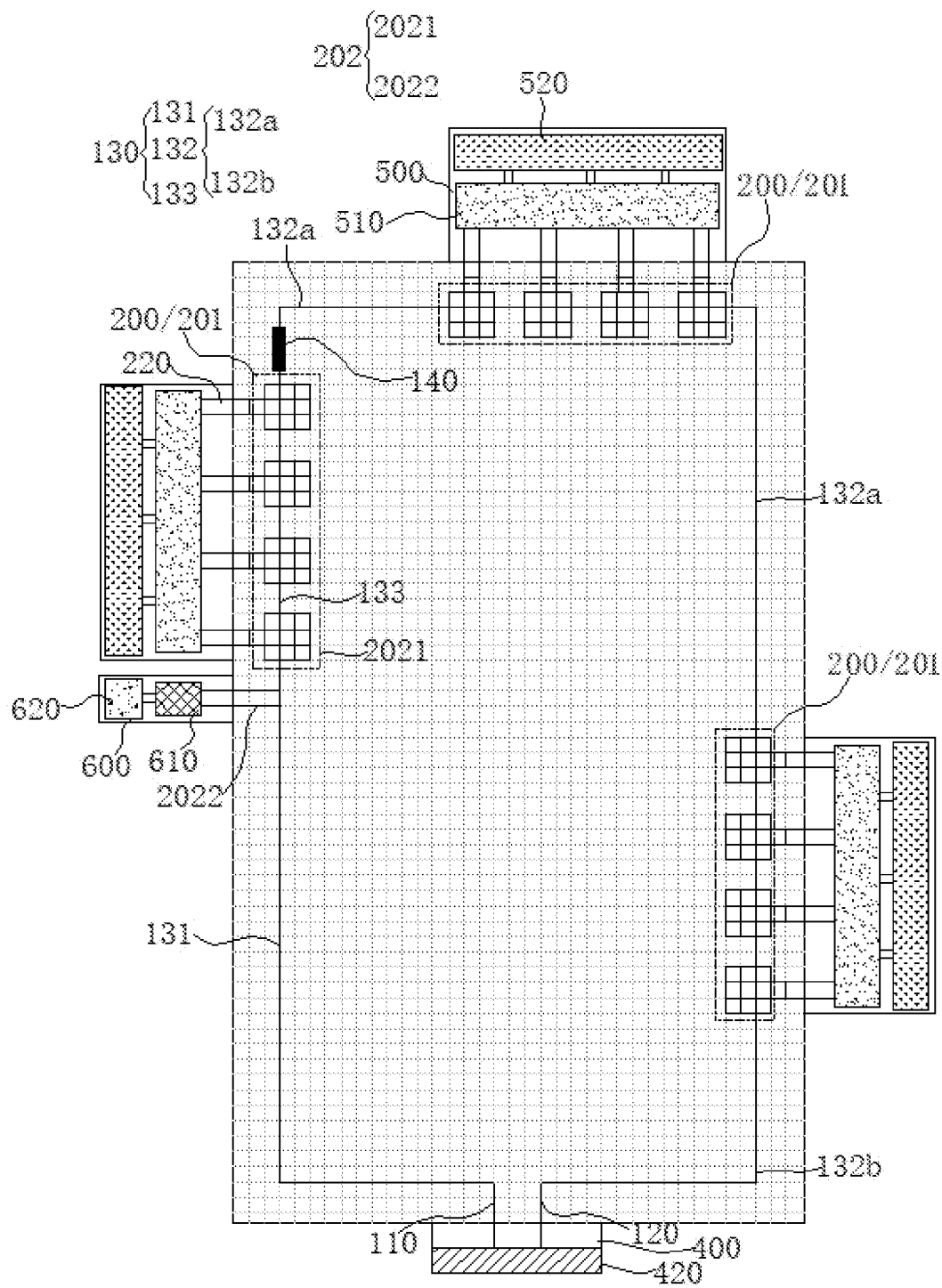
FIG. 7 is a schematic structural view of a display panel according to a sixth embodiment of a first aspect of the present application.

In some optional embodiments as shown in FIG. 7, the antenna 200 further includes a non-millimeter-wave antenna 202 for transmitting and/or receiving wireless signals in non-millimeter-wave band. The non-millimeter-wave antenna 202 is connected to the coil body 130. In an embodiment of the present application, the millimeter-wave antenna unit 210 and the non-millimeter-wave antenna 202 are connected to the coil body 130, which can further improve a light-emitting effect of the display panel. When the antenna 200 and the loop structure 100 are arranged in the touch-control layer 300, the number of cutting points can be further reduced and a touch effect can be improved.

Optionally, at least one millimeter-wave antenna unit 210 is reused as a part of the non-millimeter-wave antenna 202.

The at least one millimeter-wave antenna unit 210 being reused as a part of the non-millimeter-wave antenna 202 may be implemented in a manner in which one millimeter-wave antenna unit 210 is reused as a part of the non-millimeter-wave antenna 202, or at least two adjacent millimeter-wave antenna units 210 are connected through the third connection segment 133 and reused as a part of the non-millimeter-wave antenna 202. At least two adjacent millimeter-wave antenna units 210 being connected through the third connection segment 133 and reused as a part of the non-millimeter-wave antenna 202 means that the at least two adjacent millimeter-wave antenna units 210, when connected through the third connection segment 133, can have the function of the non-millimeter-wave antenna 202 and be configured for transmitting and/or receiving wireless signals in non-millimeter-wave band.

Optionally, the non-millimeter-wave antenna 202 includes a first portion 2021 and a second portion 2022. The first portion 2021 is a radiating portion. The second portion 2022 is a feeding portion. One millimeter-wave antenna unit 210 may be reused as a part of the first portion 2021. For example, one millimeter-wave antenna unit 210 and a part of the coil body 130 are connected to each other and reused as a part of the first portion 2021. Alternatively, two or more millimeter-wave antenna units 210 may be connected to one another and reused as the first portion 2021, and the first portion 2021 is connected to the second portion 2022.

When at least one millimeter-wave antenna unit 210 is reused as at least a part of the non-millimeter-wave antenna 202, the at least one millimeter-wave antenna unit 210 may be connected to the feeding portion of the non-millimeter-wave antenna 202, that is, the at least one millimeter-wave antenna unit 210 may be connected to the second portion 2022 of the non-millimeter-wave antenna 202. For example, the at least one millimeter-wave antenna unit 210 may be connected to the second portion 2022 of the non-millimeter-wave antenna 202 through a part of the coil body 130, so that the at least one millimeter-wave antenna unit 210 can be connected to a radio frequency integrated circuit of the non-millimeter-wave antenna 202, so as to realize the function of the non-millimeter-wave antenna 202.

When at least two adjacent millimeter-wave antenna units 210 are connected through the third connection segment 133 and reused as at least a part of the non-millimeter-wave antenna 202, the at least two adjacent millimeter-wave antenna units 210 may be connected in series with one another or connected in parallel, and reused as at least a part of the non-millimeter-wave antenna 202.

In these optional embodiments, the reusing of the non-millimeter-wave antenna 202, the millimeter-wave antenna unit 210 and at least a part of the loop structure 100 can further simplify the area occupied by the various antennas and simplify the layout patterns of the various antennas. Therefore, the number of cutting spots in metal wiring in a grid pattern can be reduced, and a desired display performance and touch-control performance of the display panel can be ensured.

Optionally, as shown in FIG. 7, the coil body 130 includes a blocking portion 140, and the blocking portion 140 is configured to allow wireless signal currents transmitted and/or received by the loop structure 100 to pass through and significantly block non-millimeter-wave currents transmitted and/or received by the non-millimeter-wave antenna 202 and millimeter-wave currents transmitted and/or received by the millimeter-wave antenna unit 210. Therefore, by providing the blocking portion 140, the non-millimeter-wave currents can be blocked, and the performance of the non-millimeter-wave antenna 202 can be designed and ensured in a better controllable manner.

For example, when the loop structure 100 is an NFC coil, the blocking portion 140 is configured to allow wireless signal currents corresponding to the NFC frequency band to pass through. When the loop structure 100 is a WPC, the blocking portion 140 is configured to allow wireless signal currents corresponding to the WPC frequency band to pass through.

There are various manners of arranging the blocking portion 140. For example, the blocking portion 140 can be arranged by changing the width of at least a part of the coil body 130, that is, the blocking portion 140 can be arranged by changing the thickness of the coil body 130, so as to block the currents corresponding to the non-millimeter-wave band. The user can set the positions, the widths, the lengths, the shapes, the film layer positions and the number of the blocking portions 140 according to the frequency band of the wireless signals in non-millimeter-wave band transmitted and/or received by the non-millimeter-wave antenna 202 and the frequency band of the wireless signals transmitted and/or received by the loop structure 100 in actual use, so as to block non-millimeter-wave currents and achieve the design of a target operating frequency in the non-millimeter-wave band.

Optionally, as shown in FIG. 7, in order to more clearly illustrate the position of the blocking portion 140, and the width of the blocking portion 140 is set to be greater than the width of the other portion of the coil body 130.

Figure 8:
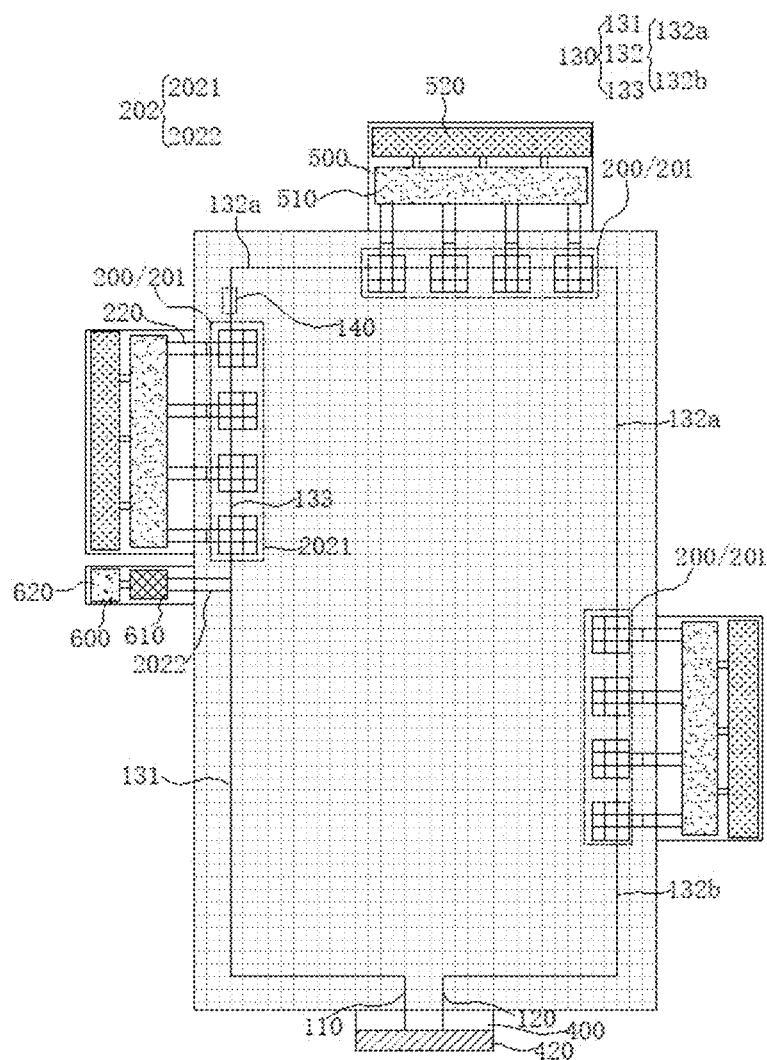
FIG. 8 is a schematic structural view of a display panel according to a seventh embodiment of a first aspect of the present application.
Figure 9:
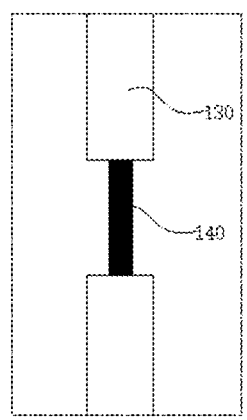
FIG. 9 is a partial magnified structural view of FIG. 8.

In some optional embodiments, as shown in FIG. 8 and FIG. 9, the width of the blocking portion 140 may not be greater than the width of the other portion of the coil body 130.

There are various positions for disposing the blocking portion 140. The blocking portion 140 may be arranged on any one of the first connection segment 131, the second connection segment 132 and the third connection segment 133. For example, when the blocking portion 140 is arranged on the first sub-segment 132*a* shown in FIG. 7, the millimeter-wave antenna units 210 of the millimeter-wave antenna array 201 between the first sub-segment 132*a* and the first connection end 110 are reused as the non-millimeter-wave antenna 202. The feeding portion (i.e., the second portion 2022) of the non-millimeter-wave antenna 202 is arranged between the first sub-segment 132*a* and the first connection end 110. As such, the current of the non-millimeter-wave antenna 202 can flow toward the blocking portion 140, or the current of the non-millimeter-wave antenna 202 can flow toward the first connection end 110, thereby forming a dual-frequency band non-millimeter-wave antenna 202.

Figure 10:
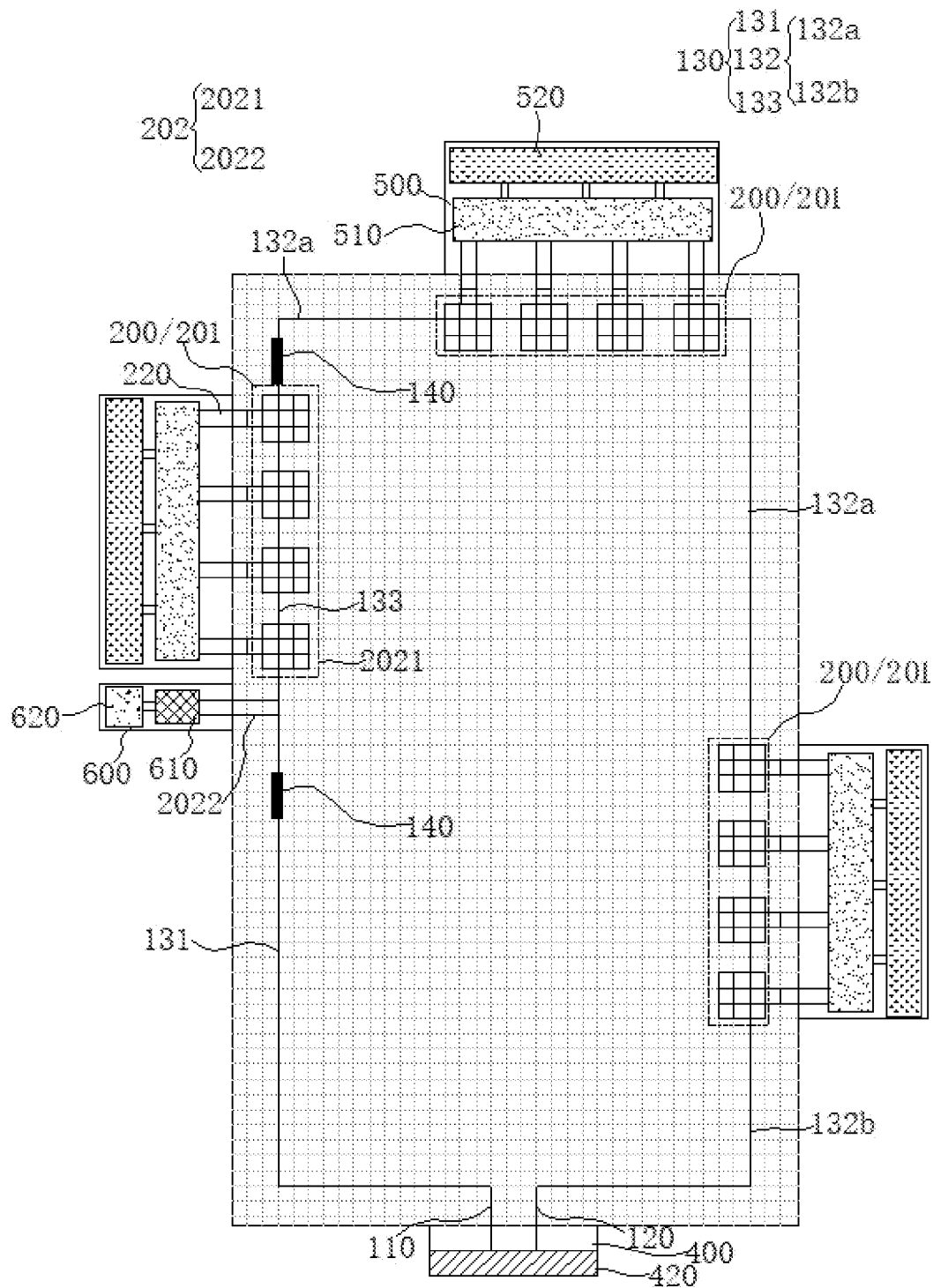
FIG. 10 is a schematic structural view of a display panel according to an eighth embodiment of a first aspect of the present application.

In some other optional embodiments, the coil body 130 includes two or more blocking portions 140. For example, as shown in FIG. 10, the coil body 130 includes two blocking portions 140. One of the blocking portions 140 is positioned on the first sub-segment 132*a*, and the other blocking portion 140 is positioned on the first connection segment 131 between the second portion 2022 and the first connection end 110. As such, the current of the non-millimeter-wave antenna 202 can flow toward the blocking portion 140 positioned on the first sub-segment 132*a*, or the current of the non-millimeter-wave antenna 202 can flow toward the blocking portion 140 positioned on the first connection segment 131, thereby forming a dual-frequency band non-millimeter-wave antenna 202. In addition, by appropriately setting the position of the blocking portion 140, the frequency band of the non-millimeter-wave antenna 202 can be controlled, so as to achieve the purpose of more accurately controlling the frequency band of the wireless signals transmitted and/or received by the non-millimeter-wave antenna 202.

In still some optional embodiments, the blocking portion 140 may be arranged on the third connection segment 133. For example, as shown in FIG. 11, two or more millimeter-wave antenna units 210 of the millimeter-wave antenna array 201 in FIG. 11 are reused as the non-millimeter-wave antenna 202, and the blocking portion 140 can be provided between the plurality of antenna units 210 reused as the non-millimeter-wave antenna array 201 and the other millimeter-wave antenna units 210.

Figure 11:
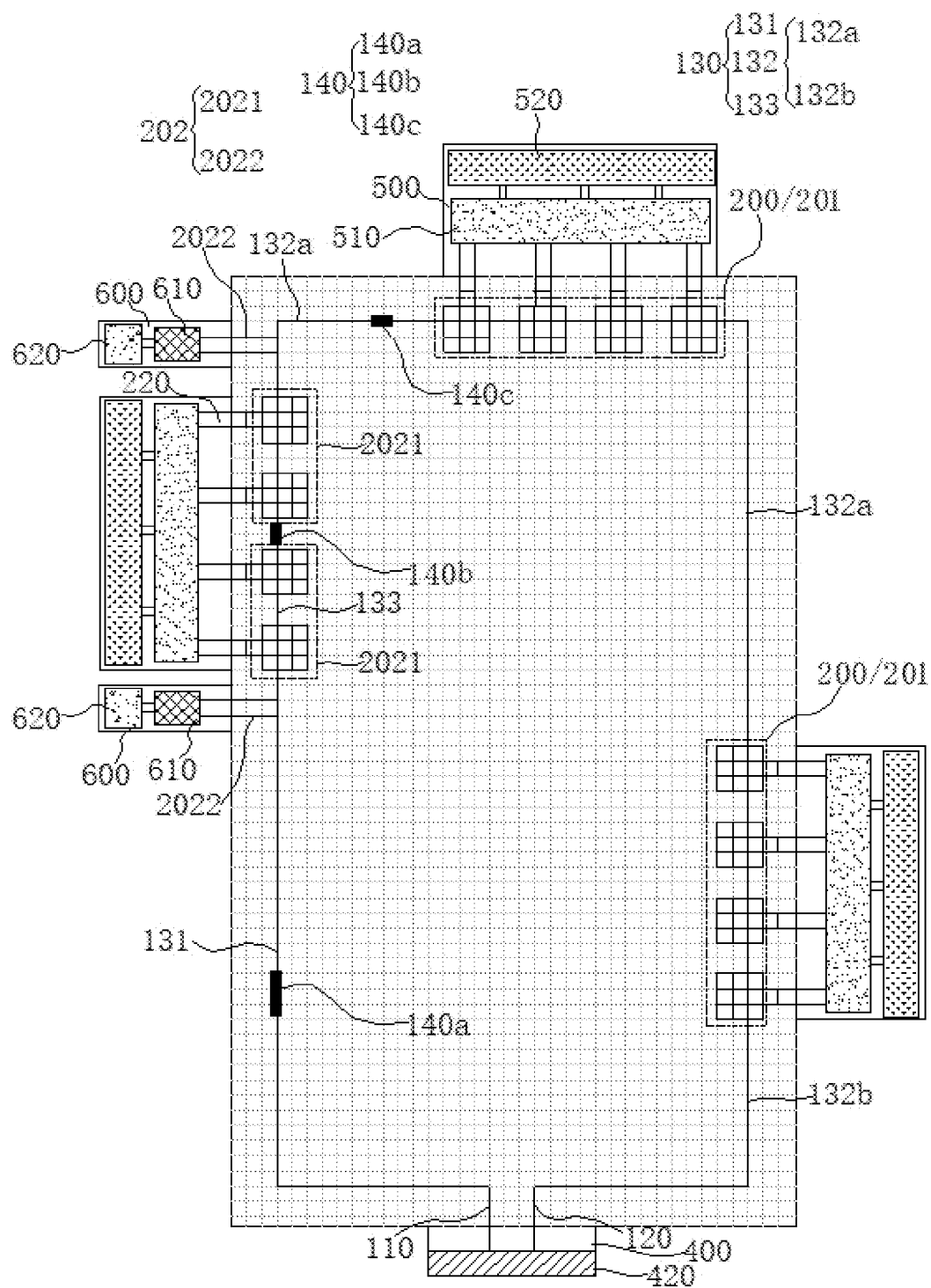
FIG. 11 is a schematic structural view of a display panel according to a ninth embodiment of a first aspect of the present application.

Optionally, in FIG. 11, for example, the blocking portions 140 are the first blocking portion 140*a*, the second blocking portion 140*b* and the third blocking portion 140*c*, respectively. The current flowing out from the second portion 2022 of the non-millimeter-wave antenna 202 can flow to the first blocking portion 140*a*, or the current flowing out from the second portion 2022 of the non-millimeter-wave antenna 202 can flow to the second blocking portion 140*b*.

Optionally, in FIG. 11, the non-millimeter-wave antenna 202 is a non-millimeter-wave antenna 202 covering a plurality of target frequency bands, that is, the currents flowing from the second portion 2022 to the first blocking portion 140*a* and the second blocking portion 140*b* are each a current in the frequency bands of the non-millimeter-wave antenna 202.

Alternatively, the non-millimeter-wave antenna 202 in FIG. 11 is a non-millimeter-wave antenna 202 covering a single target frequency band. For example, when the current flowing out from the second portion 2022 of the non-millimeter-wave antenna 202 flows to the second blocking portion 140*b*, the current is a current in the target frequency band of the non-millimeter-wave antenna 202. An appropriate design of a wire path from the second portion 2022 to the first blocking portion 140*a* can have a beneficial effect on the performance of the target frequency band of the non-millimeter-wave antenna 202.

Optionally, a plurality of millimeter-wave antenna units 210 in the millimeter-wave antenna array 201 may be reused as two non-millimeter-wave antennas 202. The blocking portion 140 may be arranged between the plurality of millimeter-wave antenna units 210 reused as different non-millimeter-wave antenna arrays 201. For example, the millimeter-wave antenna array 201 in FIG. 11 includes 4 millimeter-wave antenna units 210, wherein two adjacent millimeter-wave antenna units 210 are reused as the non-millimeter-wave antenna 202, then the blocking portion 140 can be arranged at a middle position of 4 millimeter-wave antenna units 210.

Figure 12:
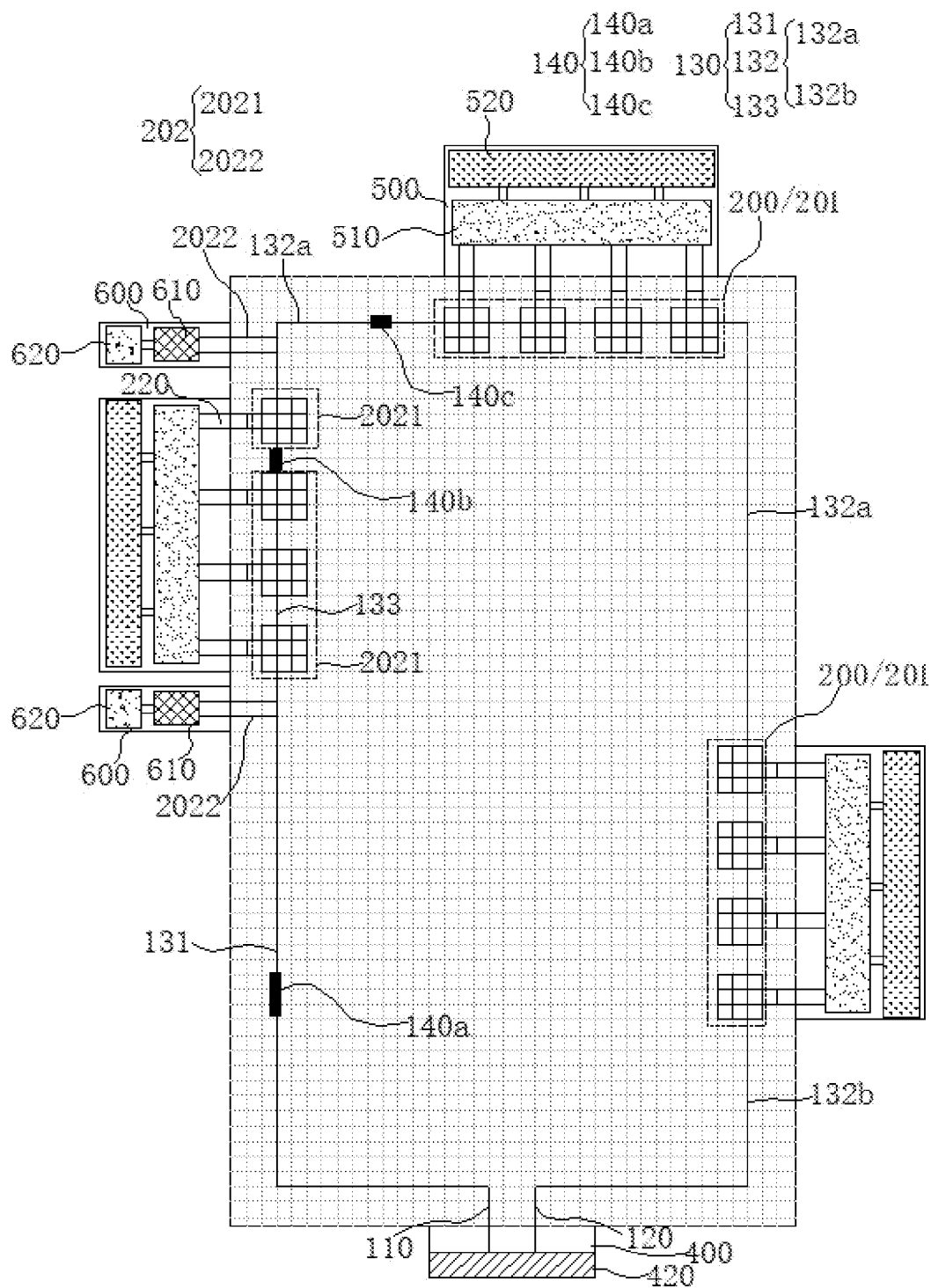
FIG. 12 is a schematic structural view of a display panel according to a tenth embodiment of a first aspect of the present application.

In other embodiments, as shown in FIG. 12, when at least one millimeter-wave antenna unit 210 is reused as a part of the first portion 2021 of the non-millimeter-wave antenna 202, the blocking portion 140 in the millimeter-wave antenna array 201 may be arranged between three millimeter-wave antenna units 210 and the other one millimeter-wave antenna unit 210.

Figure 13:
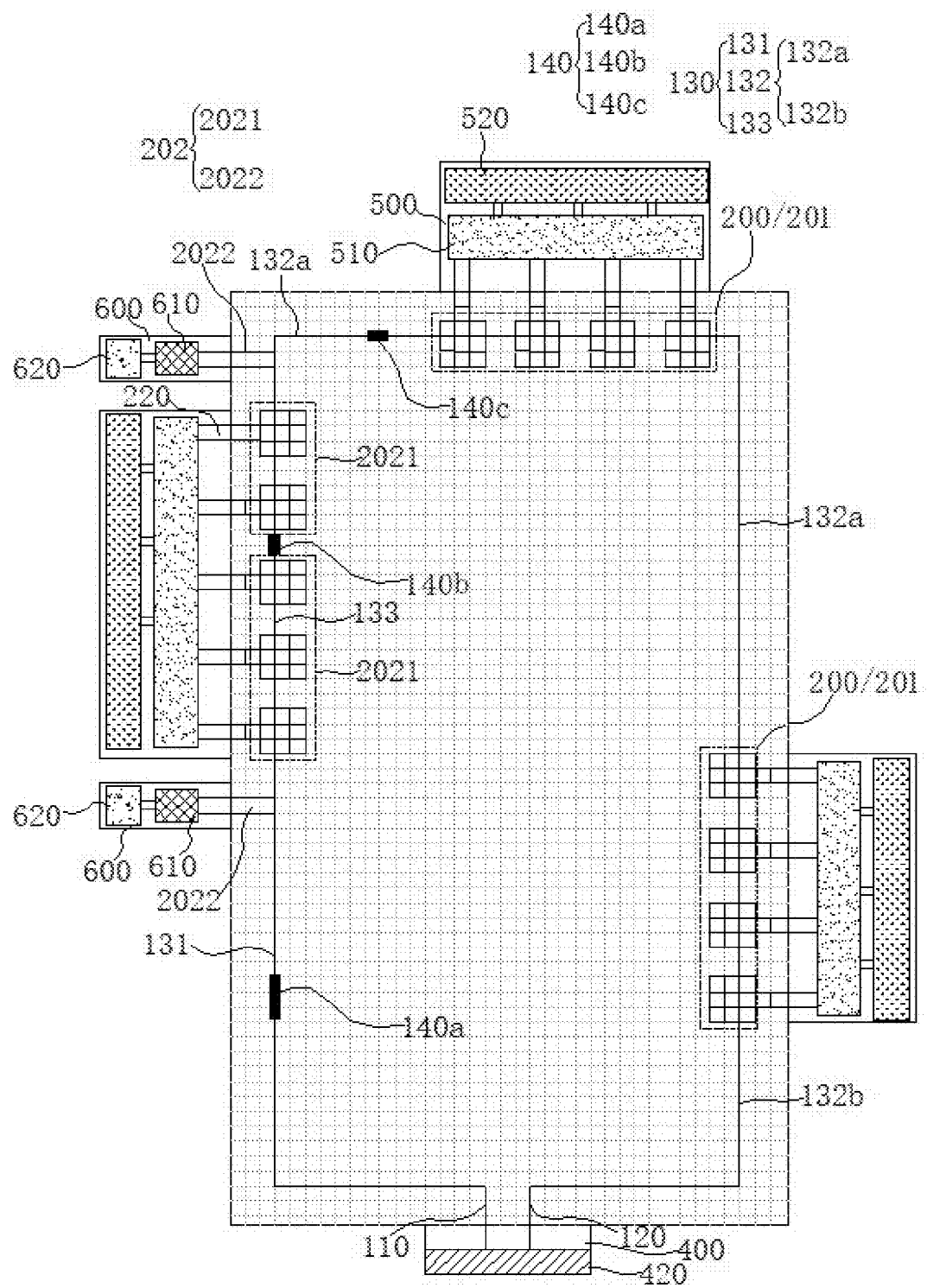
FIG. 13 is a schematic structural view of a display panel according to an eleventh embodiment of a first aspect of the present application.

In other embodiments, as shown in FIG. 13, when the number of millimeter-wave antenna units 210 is 5, the blocking portion 140 may be arranged between two millimeter-wave antenna units 210 and the other three millimeter-wave antenna units 210, or the blocking portion 140 may be arranged between one millimeter-wave antenna unit 210 and the other four millimeter-wave antenna units 210.

Optionally, when the blocking portion 140 can block the non-millimeter-wave currents, the blocking portion 140 can block the millimeter-wave currents.

Optionally, the line width of the blocking portion 140 may be less than that of the other portion of the coil body 130, or the line width of the blocking portion 140 may be greater than that of the other portion of the coil body 130.

Figure 14:
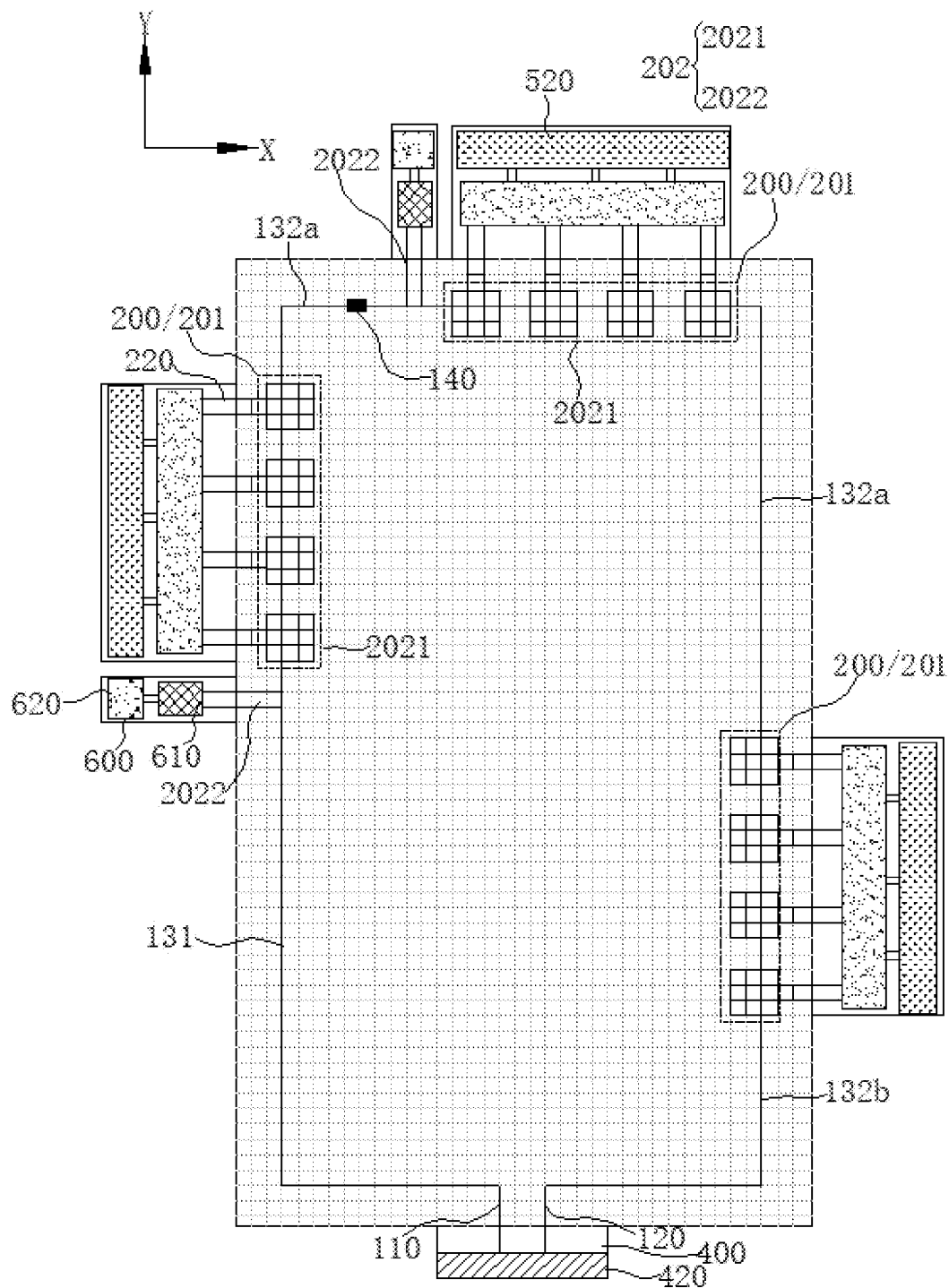
FIG. 14 is a schematic structural view of a display panel according to a twelfth embodiment of a first aspect of the present application.

Optionally, when the number of millimeter-wave antenna arrays 201 is two or more, at least one millimeter-wave antenna unit 210 of one of the millimeter-wave antenna arrays 201 may be reused as a part of the non-millimeter-wave antenna 202. Alternatively, as shown in FIG. 14, in two or more millimeter-wave antenna arrays 201, at least one millimeter-wave antenna unit 210 of each millimeter-wave antenna array 201 may be reused as a part of the non-millimeter-wave antenna 202 to increase the number of the non-millimeter-wave antennas 202.

There are various positions for disposing the loop structure 100 and the antenna 200. As shown in FIG. 1 to FIG. 14, in some optional embodiments, the display panel further includes a touch-control layer 300 including a metal wiring in a grid pattern, and the loop structure 100 and the antenna 200 are positioned in the touch-control layer 300.

In these optional embodiments, the loop structure 100 and the antenna 200 are arranged in the touch-control layer 300, so that the loop structure 100 and the antenna 200 can reuse the metal wiring in a grid pattern without adding a new structure layer, which can reduce the overall thickness of the display panel. In addition, when at least one loop structure 100 and the antenna 200 are connected to each other, the cutting points of the metal wiring in a grid pattern can be reduced, so as to ensure a desired touch-control effect of the touch-control layer 300 and the optical effect of the display panel at the same time.

Optionally, when the antenna 200 is positioned in the touch-control layer 300, as shown in FIG. 5 and FIG. 6, the millimeter-wave antenna unit 210 includes a plurality of first wires 211 extending along the first direction X and a plurality of second wires 211 extending along the second direction Y. The first direction X is intersected with the second direction Y. For example, the first direction X and the second direction Y are perpendicular to each other, or the angle between the first direction X and the second direction Y is 30 degrees, 45 degrees, 60 degrees, etc., as long as the first direction X is intersected with the second direction Y.

In these optional embodiments, the millimeter-wave antenna unit 210 includes intersecting first wires 211 and second wires 212, that is, the millimeter-wave antenna unit 210 is in a grid pattern, which can increase an area of the millimeter-wave wires in the millimeter-wave antenna unit 210, thereby reducing the impedance of the millimeter-wave antenna unit 210, which can reduce the energy loss of the millimeter-wave antenna unit 210 and the energy reflection caused by impedance mismatch, so that the millimeter-wave antenna unit 210 can desirably transmit and/or receive wireless signals in the millimeter-wave band. In addition, the millimeter-wave antenna unit 210 can directly use the metal wires in the metal wiring in a grid pattern as the first wire 211 and the second wire 212, which can further simplify the formation of the millimeter-wave antenna unit 210.

The millimeter-wave antenna unit 210 includes intersecting first wires 211 and second wires 212, that is, the millimeter-wave wires include intersecting first wires 211 and second wires 212.

Optionally, the touch-control layer 300 may be formed through intersection of a plurality of first touch-control lines parallel to the first wires 211 and a plurality of second touch-control lines parallel to the second wires 212.

Figure 15:
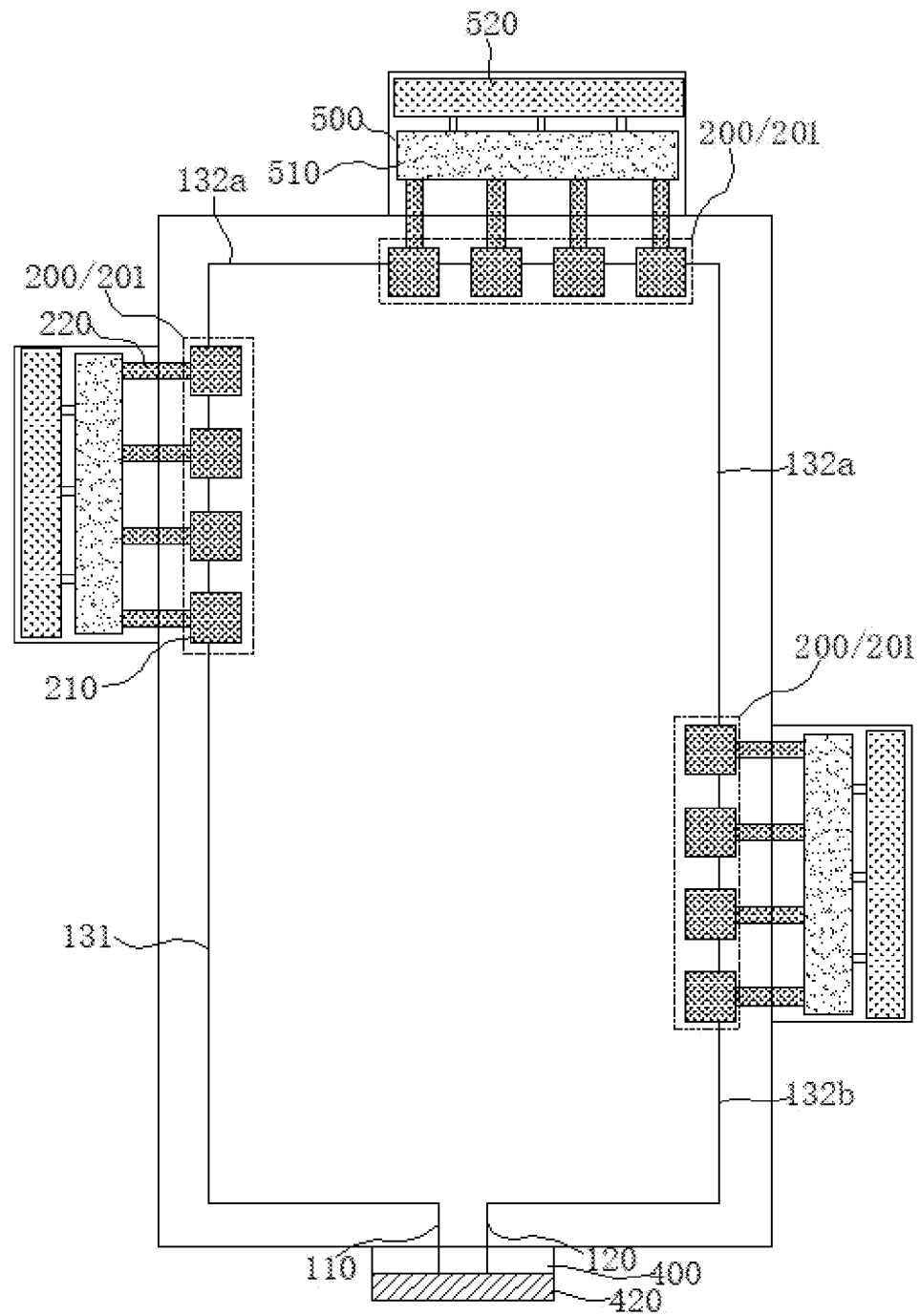
FIG. 15 is a schematic structural view of a display panel according to a thirteenth embodiment of a first aspect of the present application.

In some other embodiments, as shown in FIG. 15, the display panel may further include an antenna layer. The loop structure 100 and the antenna 200 are positioned in the antenna layer. In these optional embodiments, an antenna layer in a non-grid pattern is additionally provided in the display panel, so that the impedance of the antenna 200 and the loop structure 100 can be reduced, and the energy loss of the antenna 200 and the loop structure 100 and the energy reflection caused by impedance mismatch can be reduced, so as to improve the performance of the antenna 200 and the loop structure 100. Optionally, the loop structure 100 and the antenna 200 in the antenna layer may be formed by etching. In other embodiments, the antenna layer may be independently arranged and mounted on the display panel. Other embodiments may be selected to use for the formation the loop structure 100 and the antenna 200 in the antenna layer.

When the loop structure 100 and the antenna 200 are arranged in the antenna layer, the millimeter-wave antenna unit 210 may be in a block shape, so as to increase the area of the conductive material in the millimeter-wave antenna unit 210 and reduce the impedance of the millimeter-wave antenna unit 210 and the energy reflection caused by impedance mismatch, so that the millimeter-wave antenna unit 210 can have better performance for transmitting and/or receiving wireless signals of millimeter-waves.

When the millimeter-wave antenna unit 210 is in a block shape, the millimeter-wave antenna unit 210 may be in a shape of a square, a diamond, a circle, or the like.

Optionally, when the loop structure 100 and the antenna 200 are arranged by additionally providing the antenna layer in the display panel, and the display panel has the touch-control layer 300, the antenna layer may be arranged on a side of the touch-control layer 300 facing a cover plate of the display panel, or the antenna layer may be arranged on a side of the touch-control layer 300 facing away from the cover plate of the display panel.

Figure 16:
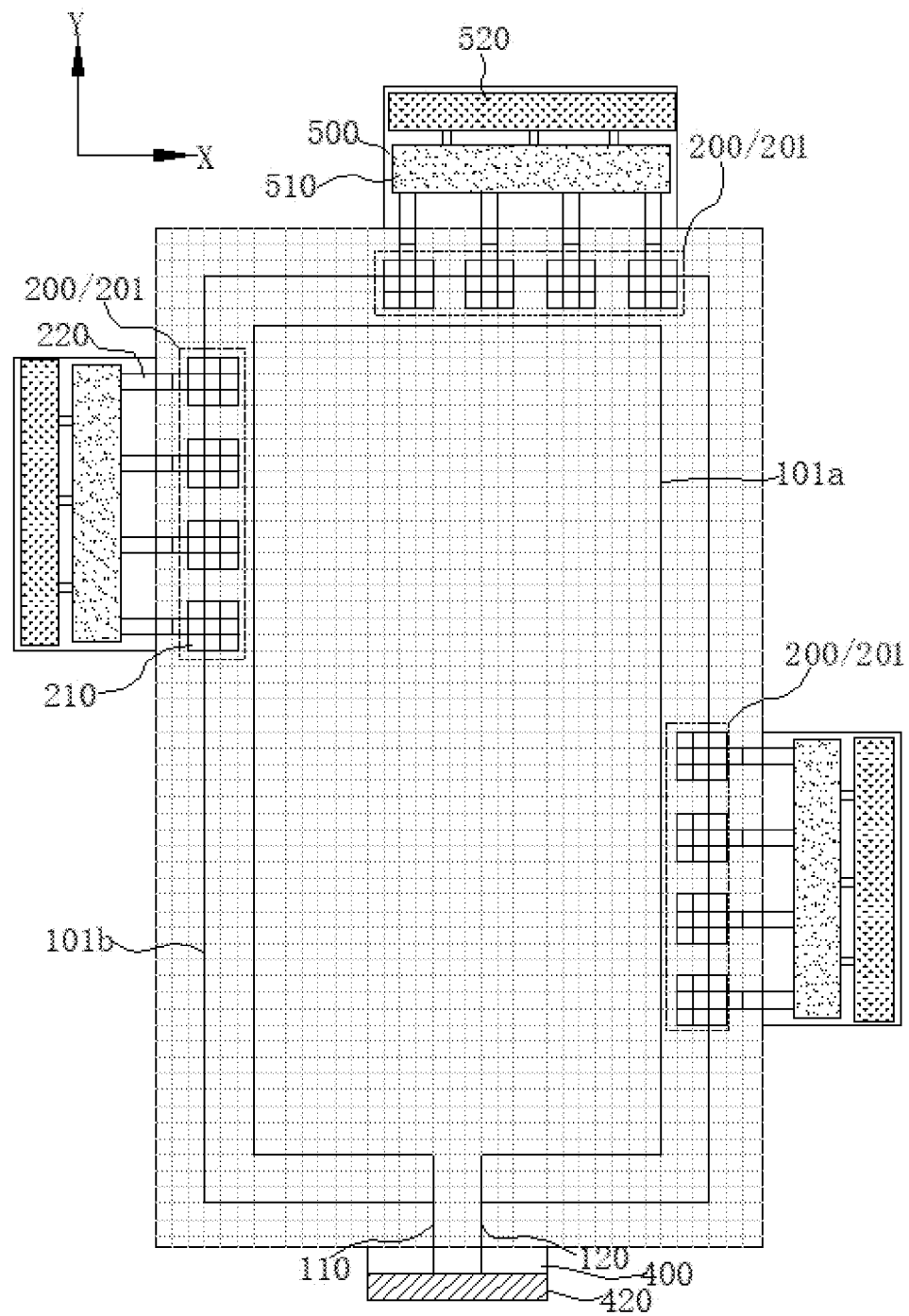
FIG. 16 is a schematic structural view of a display panel according to a fourteenth embodiment of a first aspect of the present application.

In some optional embodiments, as shown in FIG. 16, when the coil body 130 includes a plurality of coils, the millimeter-wave antenna unit 210 is connected to at least one of the plurality of coils. The plurality of coils may be connected in series, parallel or coupled with one another. The plurality of coils may be arranged to intersect or be spaced apart from one another.

When the number of the millimeter-wave antenna unit 210 is one, the millimeter-wave antenna unit 210 may be connected to one of the coils. When the antenna 200 includes a plurality of millimeter-wave antenna units 210, different millimeter-wave antenna units 210 may be connected to different coils, or different millimeter-wave antenna units 210 may be connected to a same coil.

Optionally, the plurality of coils include an inner coil 101*a* and an outer coil 101*b* surrounding a side of the inner coil 101*a* away from the center of the wireless communication structure. Each of the inner coil 101*a* and the outer coil 101*b* is connected between the first connection end 110 and the second connection end 120. That is, the outer coil 101*b* is arranged closer to the edges of the wireless communication structure.

When the coil body 130 includes the inner coil 101*a* and the outer coil 101*b*, the millimeter-wave antenna unit 210 may be connected to the inner coil 101*a* and/or the outer coil 101*b*.

For example, as shown in FIG. 16, the millimeter-wave antenna unit 210 is connected to the outer coil 101*b*. When the wireless communication structure is used for the display panel, the millimeter-wave antenna unit 210 being arranged closer to the edges of the display panel can reduce the influence of the millimeter-wave antenna unit 210 on the display effect of the display panel. When the antenna 200 is arranged in the touch-control layer 300, since the user touches the edges of the display panel in a less frequency, the millimeter-wave antenna unit 210 being arranged close to the edges of the display panel can also reduce its influence on the touch-control effect.

Alternatively, a part of the millimeter-wave antenna array 201 is connected with the inner coil 101*a* in series, and the other part of the millimeter-wave antenna array 201 is connected with the outer coil 101*b* in series.

Figure 17:
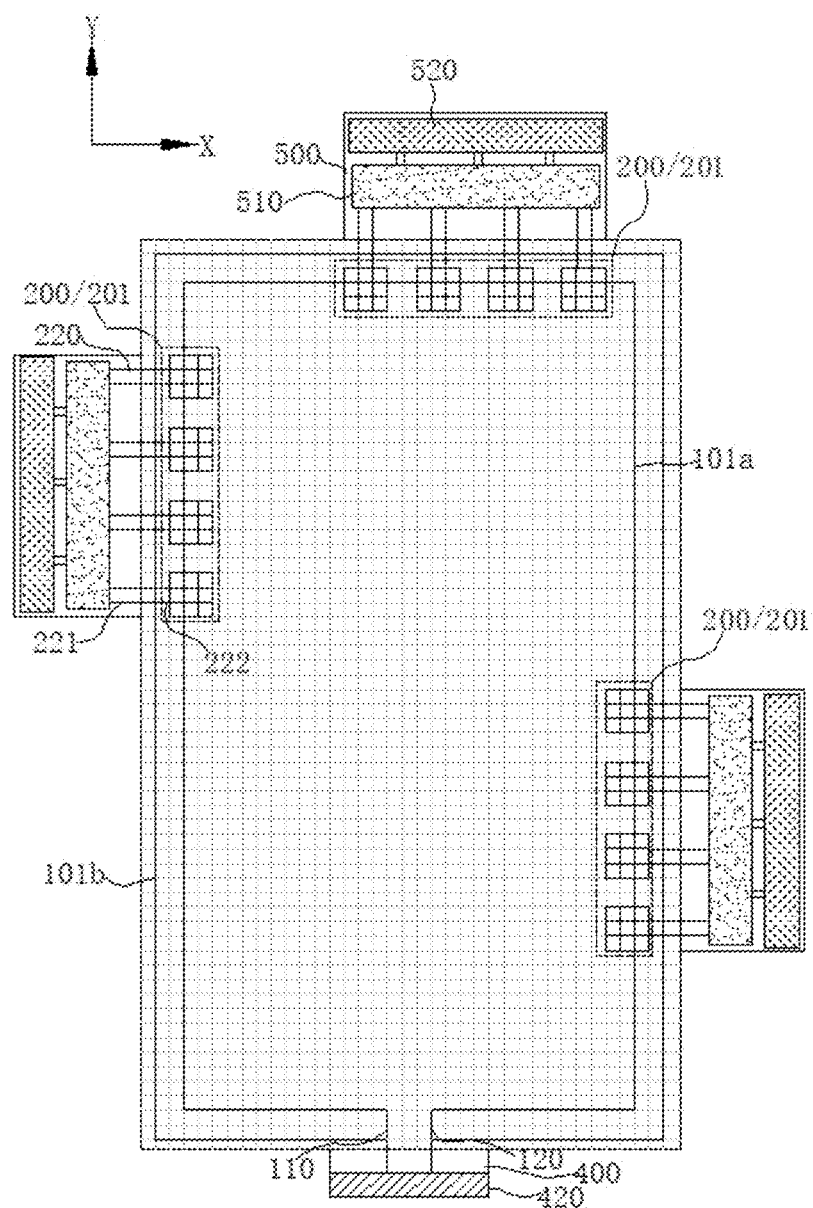
FIG. 17 is a schematic structural view of a display panel according to a fifteenth embodiment of a first aspect of the present application.
Figure 18:
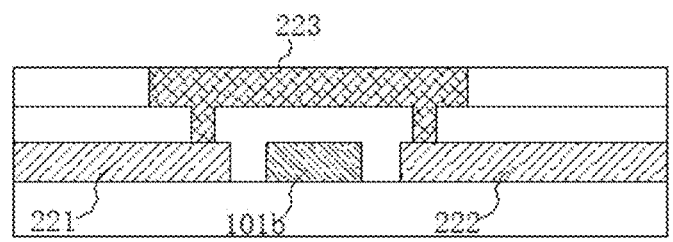
FIG. 18 is a partial cross-sectional view of FIG. 17.

In some other embodiments, as shown in FIG. 17 and FIG. 18, the antenna 200 further includes a millimeter-wave feeding portion 220 connected to the millimeter-wave antenna unit 210. The millimeter-wave antenna unit 210 is connected to the inner coil 101*a*. The millimeter-wave antenna unit 210 may be arranged in the same layer as the inner coil 101*a* and the outer coil 101*b*. At least a part of the millimeter-wave feeding portion 220 is arranged in a different layer from the outer coil 101*b*. When the millimeter-wave antenna unit 210 is connected to the inner coil 101*a*, the millimeter-wave feeding portion 220 and the outer coil 101*b* intersect, and at least a part of the millimeter-wave feeding portion 220 and the outer coil 101*b* being arranged in different layers can ensure that the millimeter-wave feeding portion 220 and the outer coil 101*b* are insulated from each other.

Optionally, the millimeter-wave feeding portion 220 includes a first conduction portion 221, a second conduction portion 222, and a bridge segment 223 connected between the first conduction portion 221 and the second conduction portion 222. The first conduction portion 221, the second conduction portion 222, and the outer coil 101b may be arranged in a same layer, and the bridge segment 223 and the outer coil 101b may be arranged in different layers, so as to ensure that the millimeter-wave feeding portion 220 and the outer coil 101b are insulated from each other.

In some other embodiments, the entire millimeter-wave feeding portion 220 may be arranged in a different layer from the outer coil 101b.

Optionally, when the loop structure 100 and the antenna 200 are arranged in the touch-control layer 300, the touch-control layer 300 includes a first touch-control electrode and a second touch-control electrode arranged in a same layer. When the connection portions between the adjacent first touch-control electrodes are arranged on the same layer as the first touch-control electrode, adjacent second touch-control electrodes need to be connected to one another through bridges, and the bridges and the second touch-control electrodes are arranged in different layers. Optionally, the bridge segment 223 may be arranged in a same layer as the bridge of the touch-control layer 300, so as to further reduce the number of layers of the display panel and make the display panel lighter and thinner.

Optionally, with further reference to FIG. 16 and FIG. 17, the inner coil 101a and the outer coil 101b are spaced apart from each other and connected with each other in parallel. The inner coil 101a and the outer coil 101b are arranged independently from each other. Each of the inner coil 101a and the outer coil 101b is connected between the first connection end 110 and the second connection end 120.

Figure 19:
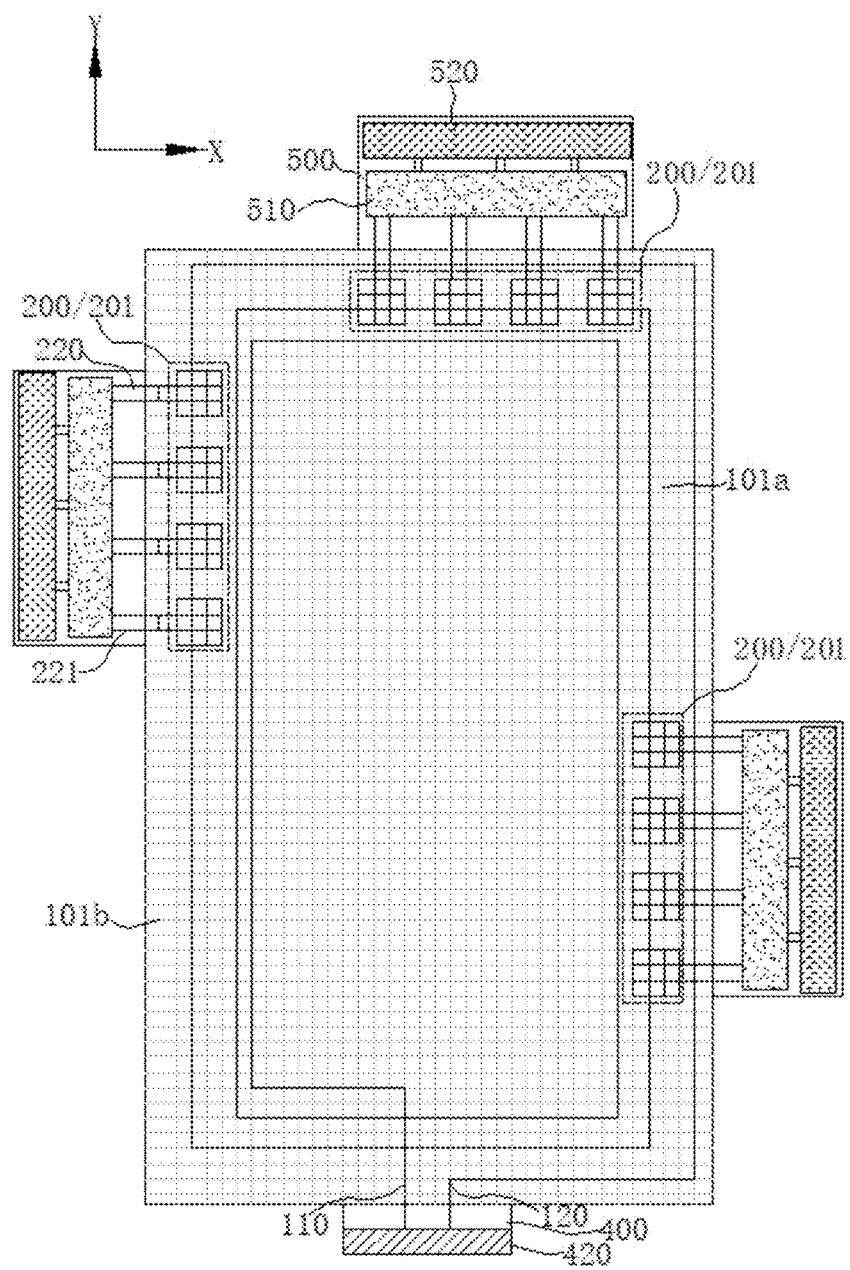
FIG. 19 is a schematic structural view of a display panel according to a sixteenth embodiment of a first aspect of the present application.

Optionally, as shown in FIG. 19, the coil bodies 130 are connected with one another in series and arranged in a spiral shape.

The inner coil 101a and the outer coil 101b may be an inner coil part and an outer coil part of the spiral coil, that is, the inner coil 101a and the outer coil 101b are connected with each other in series.

When the inner coil 101a and the outer coil 101b are spiral coils, at least one of the first connection end 110 and the second connection end 120 overlaps with a part of the coil, and at least one of the first connection end 110 and the second connection end 120 may be arranged in different layers from a part of the coil body 130.

Figure 20:
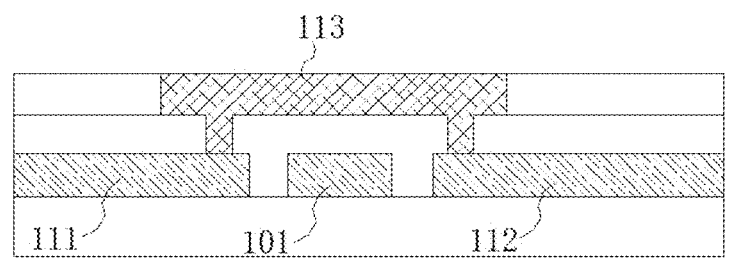
FIG. 20 is a partial cross-sectional view of FIG. 19.

As shown in FIG. 19 and FIG. 20, an embodiment of the present application takes that the first connection end 110 and a part of the coil body 130 overlap and are arranged in different layers as an example for illustration. When the coil body 130 is arranged in a plurality of turns, on the extending path of the first connection end 110, the first connection end 110 may be set to overlap with the coil body 130 which is arranged in the plurality of turns. As shown in FIG. 19, the first connection end 110 is set to overlap with the coil body 130.

Optionally, as shown in FIG. 20, the first connection end 110 includes a first segment 111, a second segment 112, and a spanning segment 113 connecting the first segment 111 and the second segment 112. The first segment 111 and the second segment 112 are positioned on two sides of the coil body 130, respectively. The spanning segment 113 and the coil body 130 are arranged in different layers, and an insulation layer is arranged between the spanning segment 113 and the coil body 130.

Optionally, when the loop structure 100 is arranged in the touch layer 300, the spanning segment 113 may be arranged in the same layer as the bridge connecting the touch-control electrodes.

Figure 21:
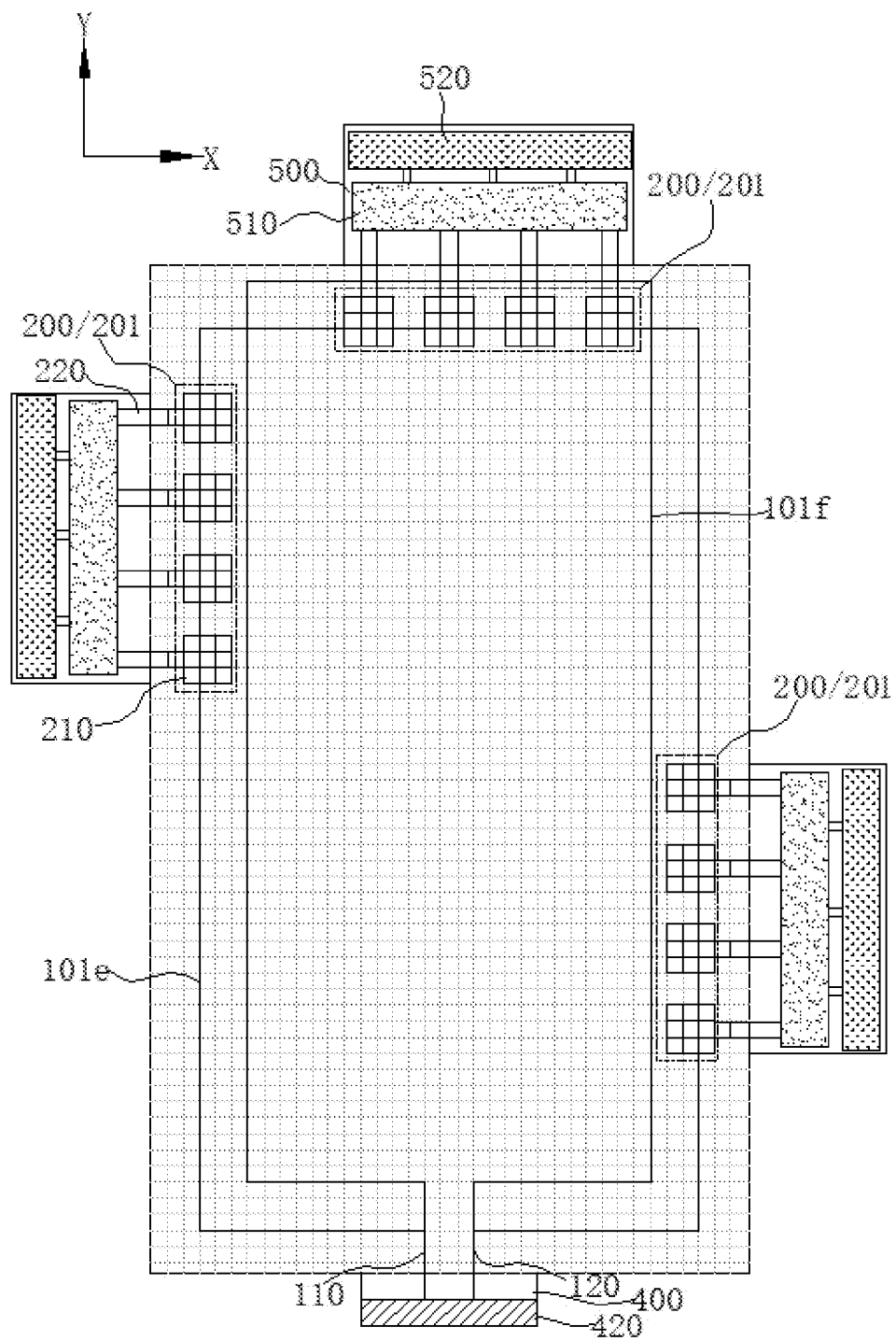
FIG. 21 is a schematic structural view of a display panel according to a seventeenth embodiment of a first aspect of the present application.

Optionally, as shown in FIG. 21, the plurality of coils include a first coil 101e and a second coil 101f. Each of the first coil 101e and the second coil 101f is connected between the first connection end 110 and the second connection end 120. A part of the first coil 101e is positioned on a side of the second coil 101f away from the center of the wireless communication structure, and a part of the second coil 101f is positioned on a side of the first coil 101e away from the center of the wireless communication structure. The millimeter-wave antenna unit 210 may be connected to the first coil 101e and/or the second coil 101f.

As shown in FIG. 21, a top portion of the first coil 101e is positioned inside a top portion of the second coil 101f, and a side portion of the first coil 101e is positioned outside a side portion of the second coil 101f. In this way, the lengths of the first coil 101e and the second coil 101f can be made similar or the same, so that the current in a same frequency band can flow on the first coil 101e and the second coil 101f.

Figure 22:
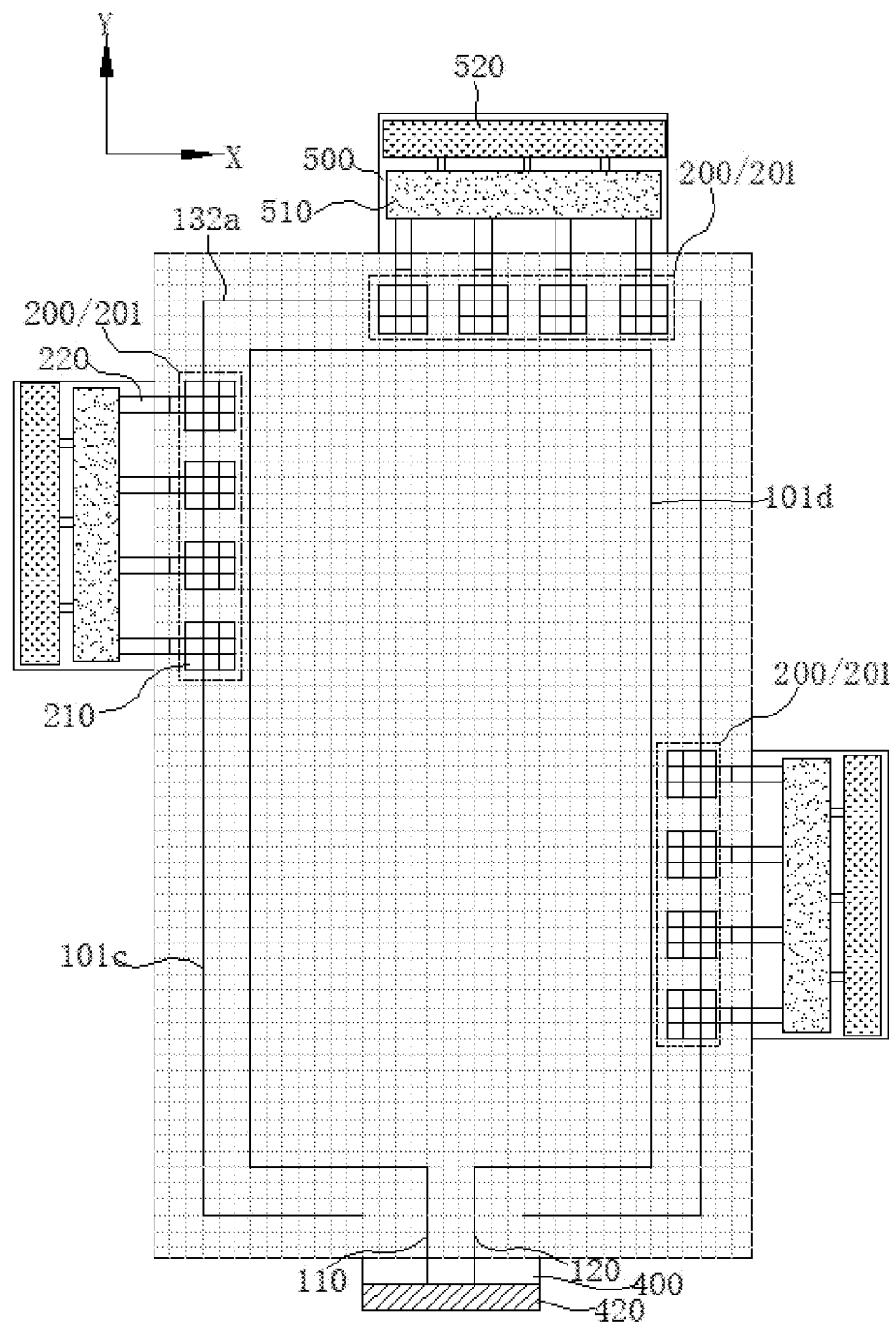
FIG. 22 is a schematic structural view of a display panel according to an eighteenth embodiment of a first aspect of the present application.

In some optional embodiments, as shown in FIG. 22, the plurality of coils include a coupled coil 101c and a direct-fed coil 101d. The direct-fed coil 101d is connected between the first connection end 110 and the second connection end 120. The coupled coil 101c is arranged by the side of the direct-fed coil 101d and spaced apart from the direct-fed coil 101d. The coupled coil 101c being connected to the direct-fed coil 101d by coupling means that the coupled coil 101c does not have a direct connection relationship with other coils (including the direct-fed coil 101d) and the coupled coil 101c is for coupling with the direct-fed coil 101d to generate signals.

When the coil body 130 includes the coupled coil 101c and the direct-fed coil 101d, the millimeter-wave antenna unit 210 may be connected to the coupled coil 101c and/or the direct-fed coil 101d. For example, as shown in FIG. 22, the coupled coil 101c is positioned on a side of the direct-fed coil 101d away from the center of the wireless communication structure, and the millimeter-wave antenna unit 210 is connected to the coupled coil 101c.

In these optional embodiments, when the wireless communication structure is used for the display panel, the coupled coil 101c is positioned on a side of the direct-fed coil 101d close to the edges of the display panel, and the millimeter-wave antenna unit 210 is connected to the coupled coil 101c, so that the millimeter-wave antenna unit 210 is arranged closer to the edges of the display panel. For example, when the millimeter-wave antenna unit 210 is arranged in the touch-control layer 300, the influence of the millimeter-wave antenna unit 210 on the touch-control effect of the touch-control layer 300 can be reduced. In addition, the millimeter-wave antenna unit 210 is arranged close to the edges of the display panel instead of close to the center of the display panel, which can also reduce the influence of the millimeter-wave antenna unit 210 on the display effect of the display panel.

Figure 23:
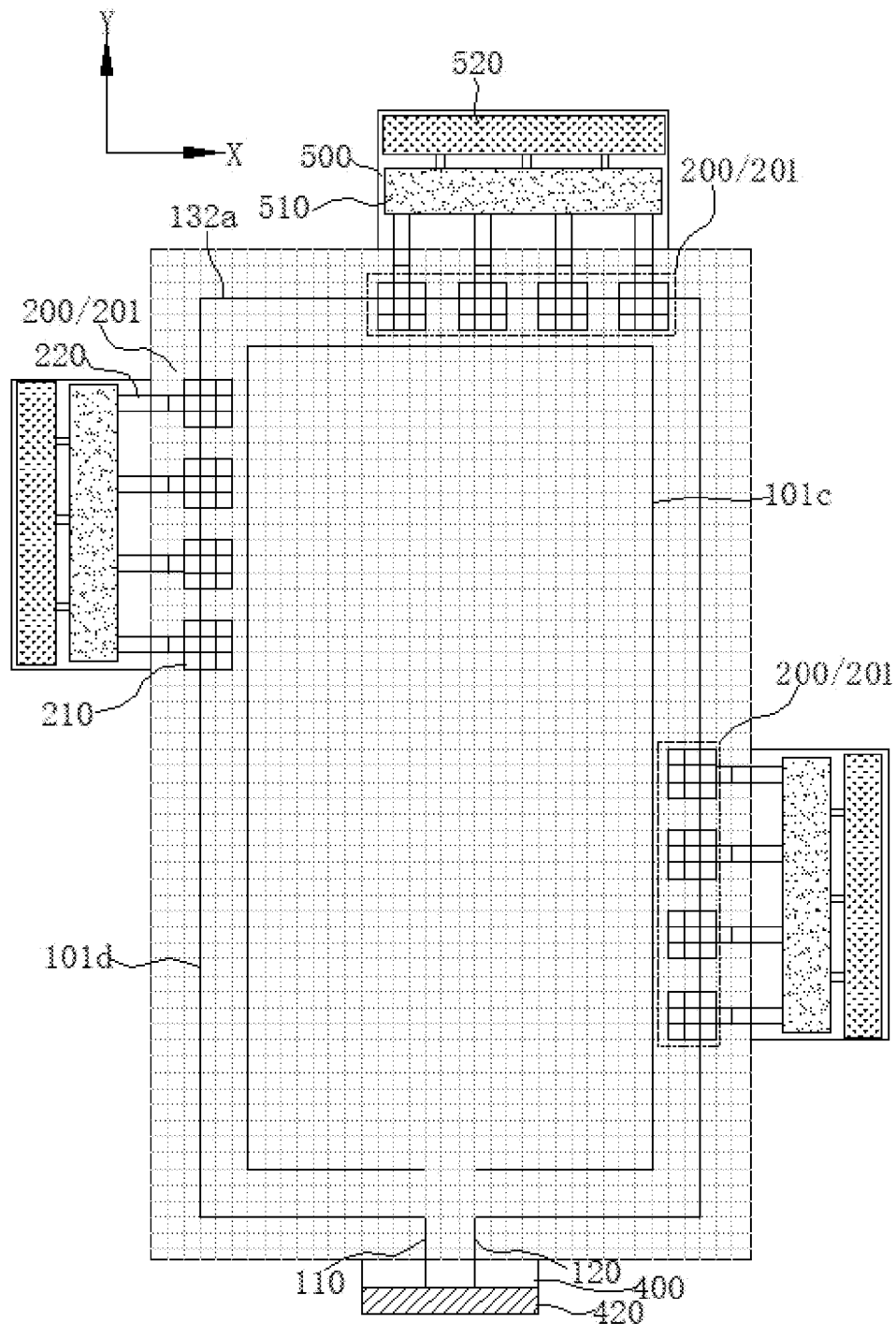
FIG. 23 is a schematic structural view of a display panel according to a nineteenth embodiment of a first aspect of the present application.

In some other optional embodiments, as shown in FIG. 23, the direct-fed coil 101d is positioned on the side of the coupled coil 101c away from the center of the wireless communication structure, and the millimeter-wave antenna unit 210 is connected to the direct-fed coil 101d. When the wireless communication structure is used for the display panel, the millimeter-wave antenna unit 210 is arranged closer to the edge of the display panel.

In addition, in an embodiment of the present application, by providing the coupled coil 101c, the performance of the loop structure 100 in transmitting and/or receiving wireless signals can be improved. For example, when the loop structure 100 is an NFC coil, the coupled coil 101c can improve the performance of the NFC coil in transmitting and/or receiving wireless signals in the NFC frequency band.

Figure 24:
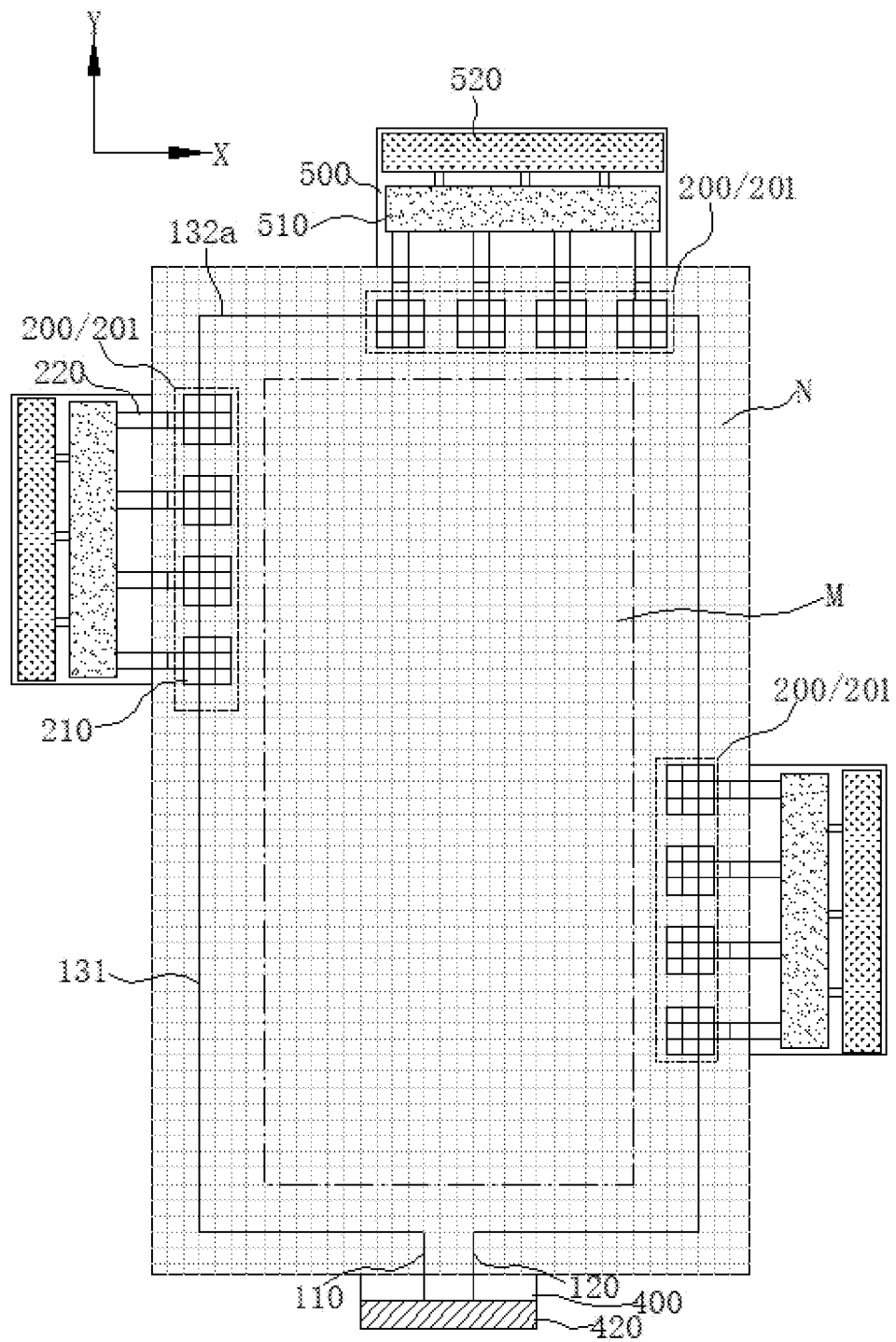
FIG. 24 is a schematic structural view of a display panel according to a twentieth embodiment of a first aspect of the present application.

In some optional embodiments, as shown in FIG. 24, the display panel includes a first area M and a second area N surrounding the first area M. The loop structure 100 is positioned in the second area N. The second area N surrounds the first area M, so that the second area N is arranged closer to the edges of the display panel. The loop structure 100 is positioned in the second area N, which can improve the influence of the loop structure 100 and the antenna 200 on the display effect of the display panel. And when the loop structure 100 and the antenna 200 are arranged in the touch-control layer 300, the influence of the loop structure 100 and the antenna 200 on the touch-control effect can also be reduced. Optionally, the antenna 200 may be positioned in the second area N, or the antenna 200 may also be partially arranged in the first area M.

The second area N may be arranged in various manners. For example, the second area N may include a display area; and/or the second area N may include a non-display area. When the second area N includes a non-display area, the loop structure 100 is positioned in the non-display area, which can desirably reduce the influence of the loop structure 100 on the display effect and the touch-control effect.

The loop structure 100 may be arranged in the first area M in various manners. For example, as shown in FIG. 24, the loop structure 100 is arranged around the first area M in the second area N, which can increase an extension length of the loop structure 100 and the extension length of the coil body 130 of the loop structure 100, so as to implement a designed target frequency band and enhance the wireless performance of the frequency band.

Optionally, as shown in FIG. 24, the first connection end 110 and the second connection end 120 are arranged close to each other. The coil body 130 extends around the first area M from the first connection end 110 and then is connected to the second connection end 120. The distance between the first connection end 110 and the second connection end 120 is small, which not only facilitates the integration of a connector for transmitting signals from/to the first connection end 110 and a connector for transmitting signals from/to the second connection end 120, but also increases the extension length of the coil body 130 to implement the designed target frequency band, thereby enhancing the wireless performance of the frequency band.

Figure 25:
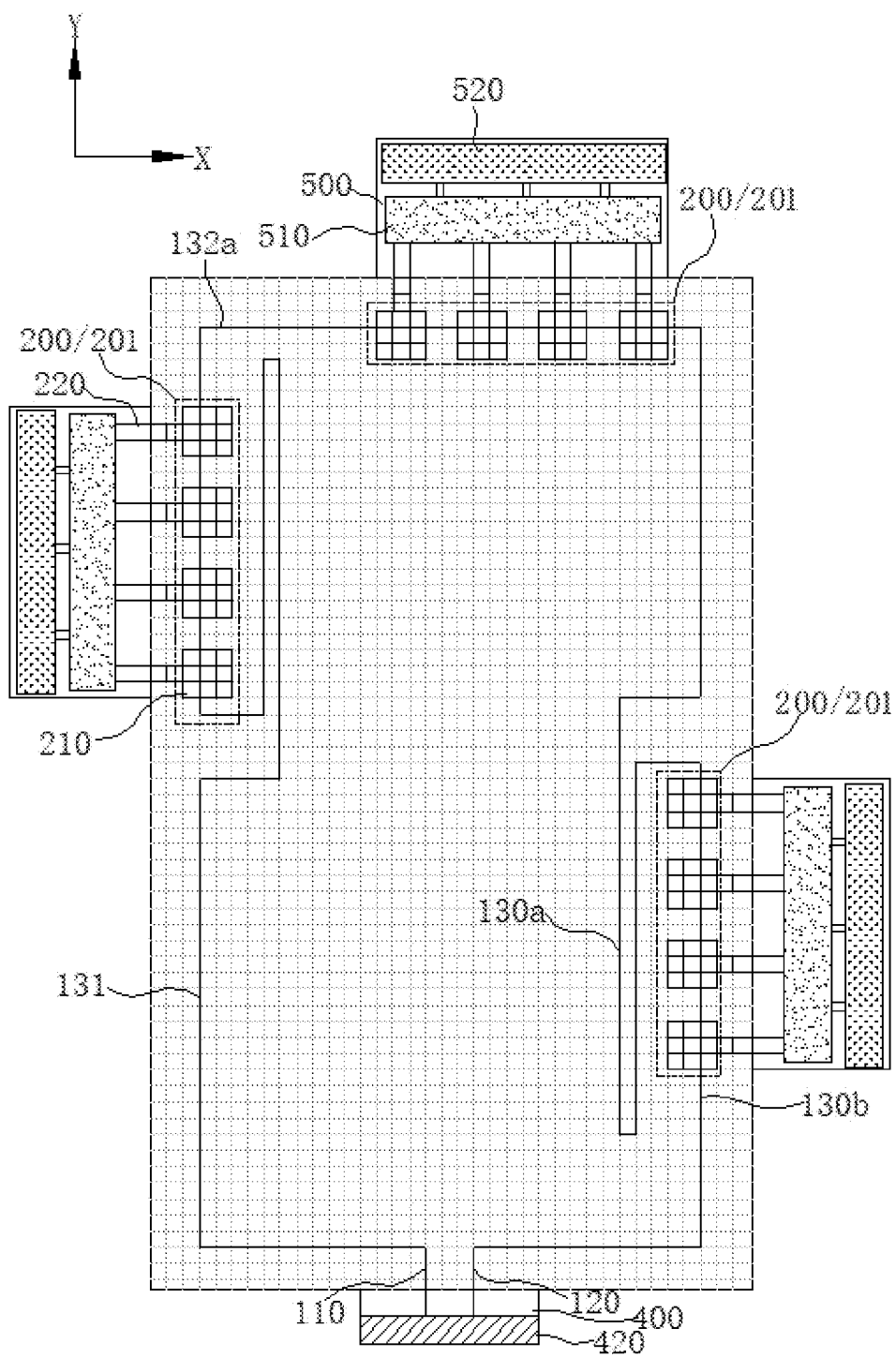
FIG. 25 is a schematic structural view of a display panel according to a twenty first embodiment of a first aspect of the present application.

In some embodiments, as shown in FIG. 25, the coil body 130 is formed as extending along a winding path. A same coil body 130 includes a first extension segment 130a and a second extension segment 130b that overlap with each other in a direction approaching the edges of the wireless communication structure. In these optional embodiments, the coil body 130 extends along the winding path, and one part of the coil body 130 overlaps another part of the coil body 130 in the direction approaching the edges of the wireless communication structure, which can increase the extension length of the coil body 130 to implement the designed target frequency band, and improve the wireless performance of the coil body 130.

Optionally, the millimeter wave antenna unit 210 is connected to the second extension segment 130b. When the wireless communication structure is used for the display panel, the second extension segment 130b is closer to the edges of the display panel compared to the first extension segment 130a. When the millimeter-wave antenna array 201 is connected to the second extension segment 130b in series, the millimeter-wave antenna array 201 is closer to the edge of the display panel, which can reduce the influence of the millimeter-wave antenna array 201 on the touch-control effect and the display effect of the display panel.

Figure 26:
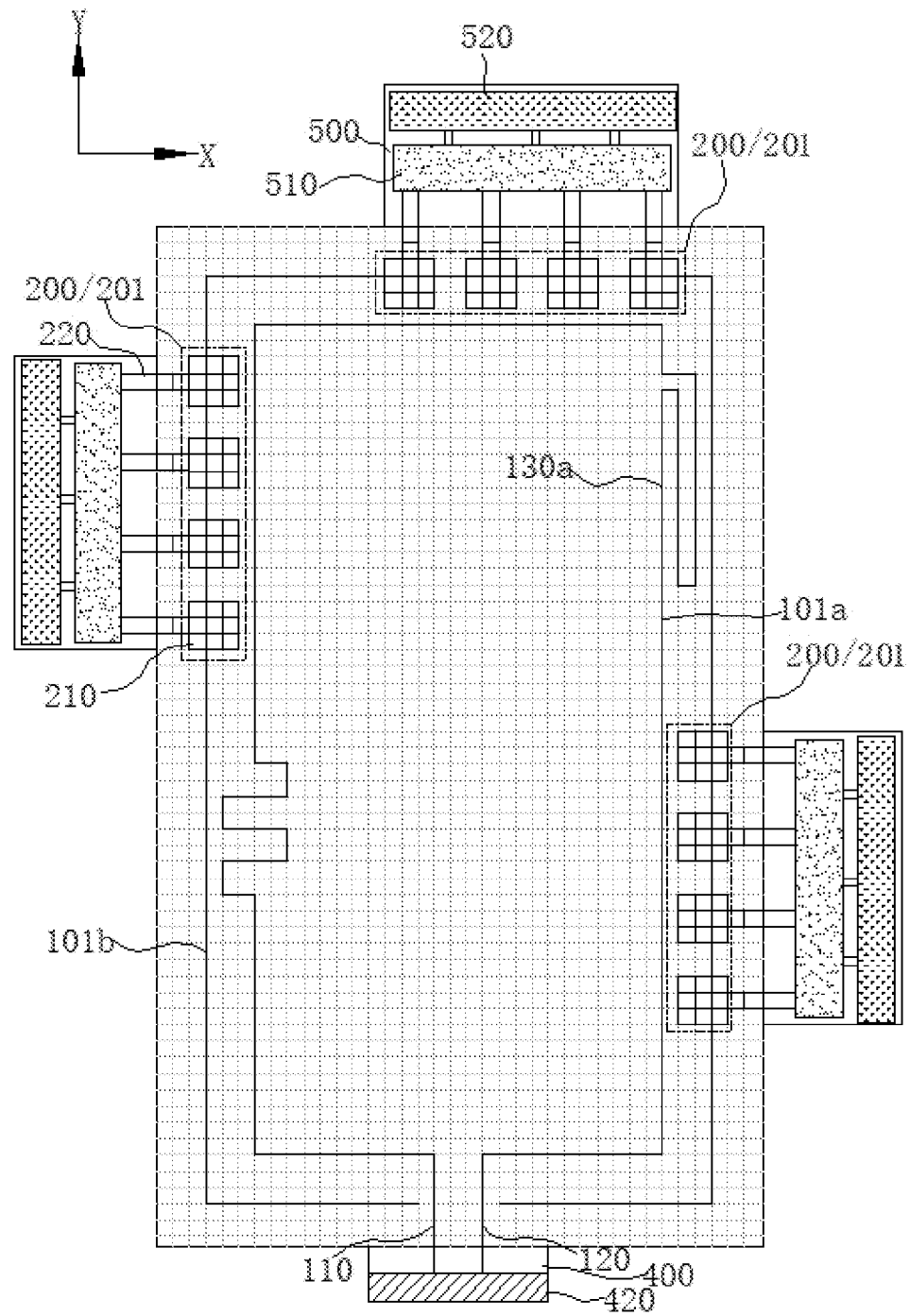
FIG. 26 is a schematic structural view of a display panel according to a twenty second embodiment of a first aspect of the present application.

Optionally, as shown in FIG. 26, when the coil body 130 includes the inner coil 101a and the outer coil 101b, the first extension segment 130a and the second extension segment 130b may be arranged on the inner coil 101a, which can also increase the extension length of the coil body 130, so as to implement the designed target frequency band and improve the wireless performance of the coil body 130.

Optionally, as shown in FIG. 26, at least a part of the coil body 130 is formed as extending along a winding path. For example, at least a part of the coil body 130 is formed as extending along a winding serpentine path, so that the extension length of the coil body 130 can be increased, so as to implement the designed target frequency band and improve the wireless performance of the coil body 130.

Figure 27:
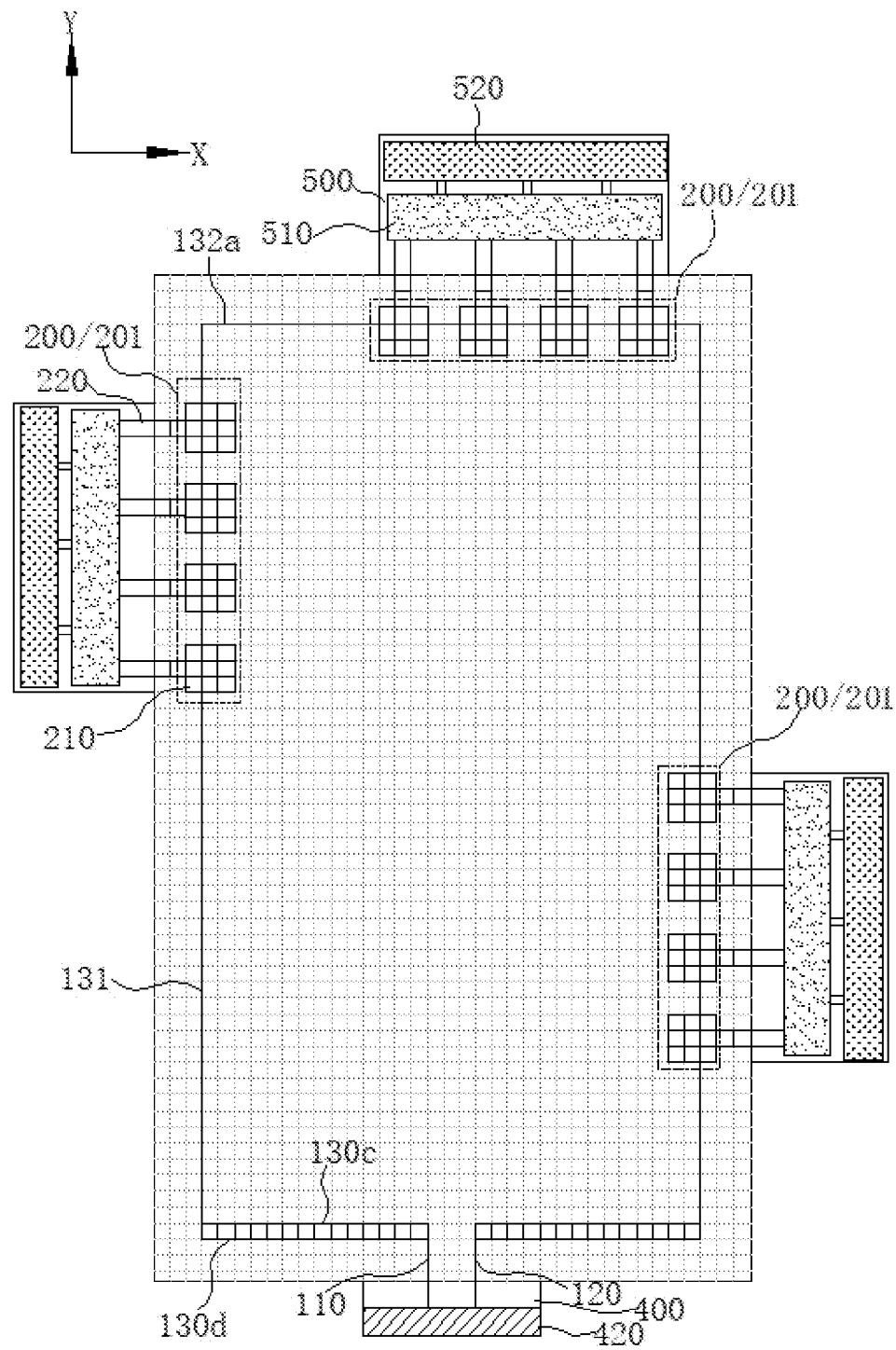
FIG. 27 is a schematic structural view of a display panel according to a twenty third embodiment of a first aspect of the present application.

In some optional embodiments, as shown in FIG. 27, at least a part of the coil body 130 includes a first section 130c and a second section 130d connected to each other, that is, at least a part of the coil body 130 is provided with a double-stranded wire, which can reduce the impedance of the coil body 130 and thus energy loss and energy reflection caused by impedance mismatch, thereby improving the wireless performance of the coil body 130.

Optionally, the millimeter-wave antenna unit 210 is not aligned with the first section 130c or the second section 130d, that is, the millimeter-wave antenna array 201 is connected to the non-double-stranded wire portion of the coil body 130, which can simplify the connection between the millimeter-wave antenna array 201 and the coil body 130.

Figure 28:
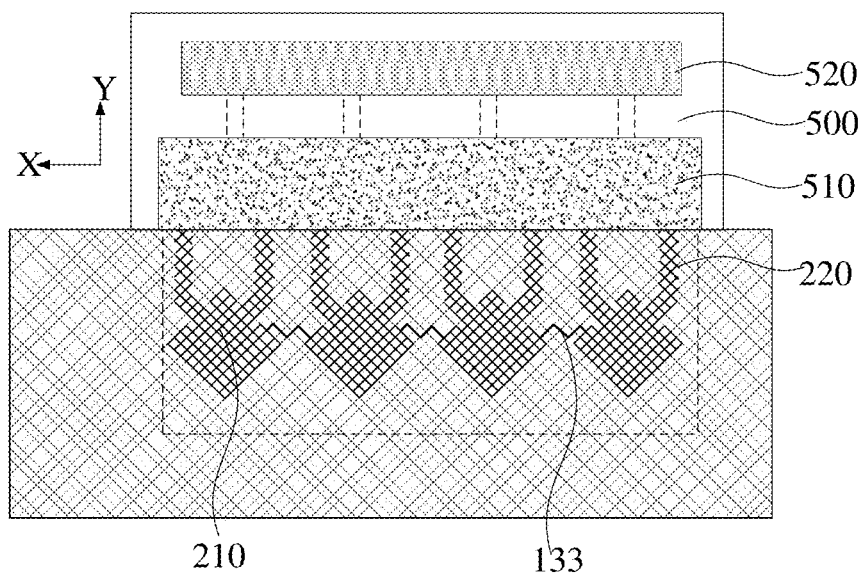
FIG. 28 is a schematic structural view of a display panel according to a twenty fourth embodiment of a first aspect of the present application.

In any of the above embodiments, the millimeter-wave antenna unit 210 may be a single-polarization millimeter-wave antenna unit. Alternatively, as shown in FIG. 28, the millimeter-wave antenna unit 210 is a dual-polarization millimeter-wave antenna unit.

In any of the above embodiments, different parts of the coil body 130 may be arranged in a same layer, that is, the first connection segment 131, the second connection segment 132 and the third connection segment 133 may be arranged in a same layer.

Alternatively, different parts of the coil body 130 may be arranged in different layers. For example, at least two of the first connection segment 131, the second connection segment 132 and the third connection segment 133 are positioned in different film layers. Different parts of at least one of the first connection segment 131, the second connection segment 132 and the third connection segment 133 may be positioned in a same layer. Alternatively, different parts of at least one of the first connection segment 131, the second connection segment 132 and the third connection segment 133 may be positioned in different layers. For example, different parts of the first connection segment 131 may be positioned in different layers, different parts of the second connection segment 132 may be positioned in different layers, and/or different parts of the third connection segment 133 may be positioned in different layers.

Figure 29:
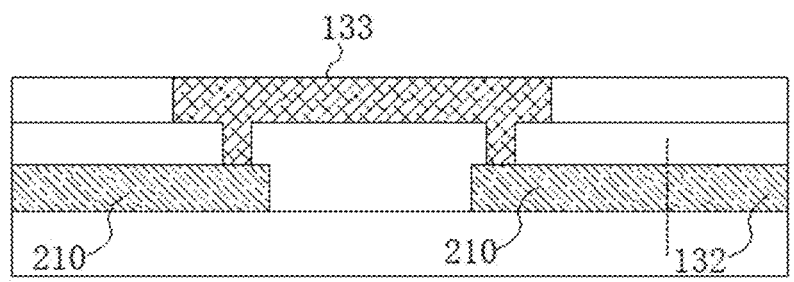
FIG. 29 is a partial cross-sectional view of FIG. 5.

Reference is made to FIG. 29, which is a partial cross-sectional view taken along line A-A in FIG. 5 in a twenty seventh embodiment. Optionally, the second connection segment 132 and the millimeter-wave antenna unit 210 may be arranged in a same layer, and the third connection segment 133 and the second connection segment 132 may be arranged in different layers.

As shown in FIG. 30 to FIG. 36, an embodiment of the present application further provides a wireless communication apparatus, including the display panel according to any foregoing embodiment of the first aspect. Since the wireless communication apparatus provided by an embodiment of the present application includes the display panel of any of the above embodiments, the wireless communication apparatus provided by an embodiment of the present application has the beneficial effects of the display panel of any of the above embodiments of the first aspect, and will not be repeated here.

The wireless communication apparatus in an embodiment of the present application include but are not limited to a device with display functions, such as a cell phone, a wireless wearable device, a personal digital assistant (PDA for short), a tablet computer, an e-book, a television, an access control, a smart fixed phone, a console, or the like.

Figure 30:
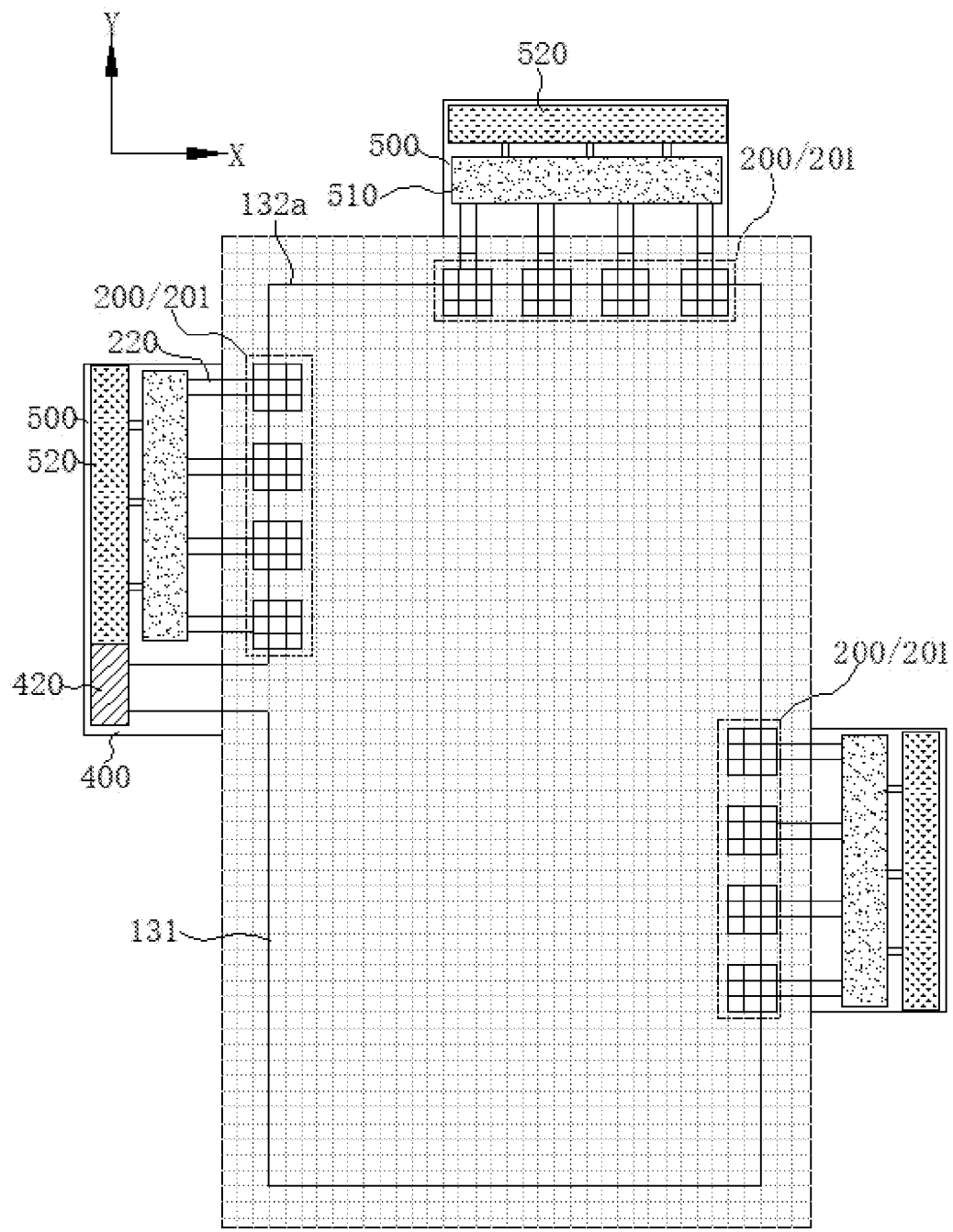
FIG. 30 is a schematic structural view of a wireless communication apparatus according to a first embodiment of a second aspect of the present application.

In some optional embodiments, as shown in FIG. 30, the wireless communication apparatus further includes a first circuit board 400, a second circuit board 500, a first transmission line disposed on the first circuit board 400 and a second transmission line disposed on the second circuit board 500. The first transmission line is in communication with the first connection end 110 and/or the second connection end 120 of at least one coil body 130. The second transmission line is in communication with the millimeter-wave antenna unit 210.

Optionally, as shown in FIG. 30, the antenna 200 includes at least two millimeter-wave antenna units 210. Two or more millimeter-wave antenna units 210 form a millimeter-wave antenna array 201. The antenna 200 includes a plurality of millimeter-wave antenna arrays 201. The wireless communication apparatus includes a plurality of circuit boards corresponding to the plurality of millimeter-wave antenna arrays 201 respectively. The circuit boards corresponding to the plurality of millimeter-wave antenna arrays 201 may be the second circuit boards 500, so that the millimeter-wave antenna array 201 can transmit signals with the corresponding second circuit board 500 nearby.

The first circuit board 400 and the second circuit board 500 may be arranged in various manners. For example, the first circuit board 400 and the second circuit board 500 may be provided separately from each other.

In some optional embodiments, as shown in FIG. 30, the first circuit board 400 is integrated with the second circuit board 500, which can simplify the structure of the wireless communication apparatus.

Optionally, the wireless communication apparatus may further include a first integrated circuit in communication with the first connection end 110 and/or the second connection end 120 through the first transmission line. The first integrated circuit may be arranged in various positions. The first integrated circuit may be arranged on the first circuit board 400, or the first integrated circuit may be directly arranged on a printed circuit board (PCB) of the wireless communication apparatus.

Optionally, the wireless communication apparatus may further include a second integrated circuit 510 in communication with the millimeter-wave antenna unit 210 through the second transmission line. The second integrated circuit 510 may be arranged in various positions. The second integrated circuit 510 may be arranged on the second circuit board 500, or the second integrated circuit 510 may be directly arranged on the PCB of the wireless communication apparatus.

In an embodiment of the present application, the first integrated circuit being arranged on the PCB of the wireless communication apparatus and the second integrated circuit 510 being arranged on the second circuit board 500 is taken as an example for illustration.

When the loop structure 100 is an NFC coil, the first integrated circuit is an NFC radio frequency integrated circuit. When the second integrated circuit 510 is in communication with the millimeter-wave antenna unit 210, the second integrated circuit 510 is a millimeter-wave radio frequency integrated circuit. Due to the filtering and frequency selectivity of the millimeter-wave radio frequency circuit, the current in the NFC frequency band and the current in other non-millimeter-wave bands are significantly blocked by the millimeter-wave radio frequency circuit, and signals in the NFC frequency band and signals in other non-millimeter-wave band do not have significant influence on the performance of the millimeter-wave radio frequency circuit, so as that a desired performance of the millimeter-wave radio frequency circuit can be ensured.

Optionally, when the antenna includes a plurality of millimeter-wave antenna arrays 201, the wireless communication apparatus includes a plurality of second circuit boards 500 and a plurality of second integrated circuits 510. The second integrated circuits 510 are in communication with the millimeter-wave antenna arrays 201 through the second transmission lines on the second circuit boards 500. A plurality of second circuit boards 500 may be provided separately from each other, and a first circuit board 400 may be integrated with any of second circuit boards 500. Alternatively, a plurality of second circuit boards 500 may be formed integrally, that is, a first circuit board 400 may be integrated with a plurality of second circuit boards 500, which can further simplify the structure of the wireless communication apparatus.

In some optional embodiments, the wireless communication apparatus further includes a first connection socket 420 and a second connection socket 520. The first connection socket 420 is provided on the first circuit board 400 and is in communication with the first transmission line on the first circuit board 400, which enables the communication between the first integrated circuit and the coil body 130 through the first connection socket 420. The second connection socket 520 is provided on the second circuit board 500 and is in communication with the second integrated circuit 510 on the second circuit board 500, which enables the signal transmission between the second integrated circuit 510 and the PCB of the wireless communication apparatus.

That is, when the first integrated circuit is provided on the PCB of the wireless communication apparatus, and the second integrated circuit 510 is provided on the second circuit board 500, the first connection socket 420 is configured to enable the communication between the coil body 130 and the first integrated circuit, and the second connection socket 520 is configured to enable the communication between the second integrated circuit 510 and the PCB of the wireless communication apparatus.

The first connection socket 420 and the second connection socket 520 may be arranged in various manners. For example, when the first circuit board 400 and the second circuit board 500 are provided separately from each other, the first connection socket 420 and the second connection socket 520 are provided separately from each other.

In some optional embodiments, as shown in FIG. 30, when the first circuit board 400 is integrated with the second circuit board 500, the first connection socket 420 is integrated with the second connection socket 520, which can further simplify the structure of the wireless communication apparatus.

Figure 31:
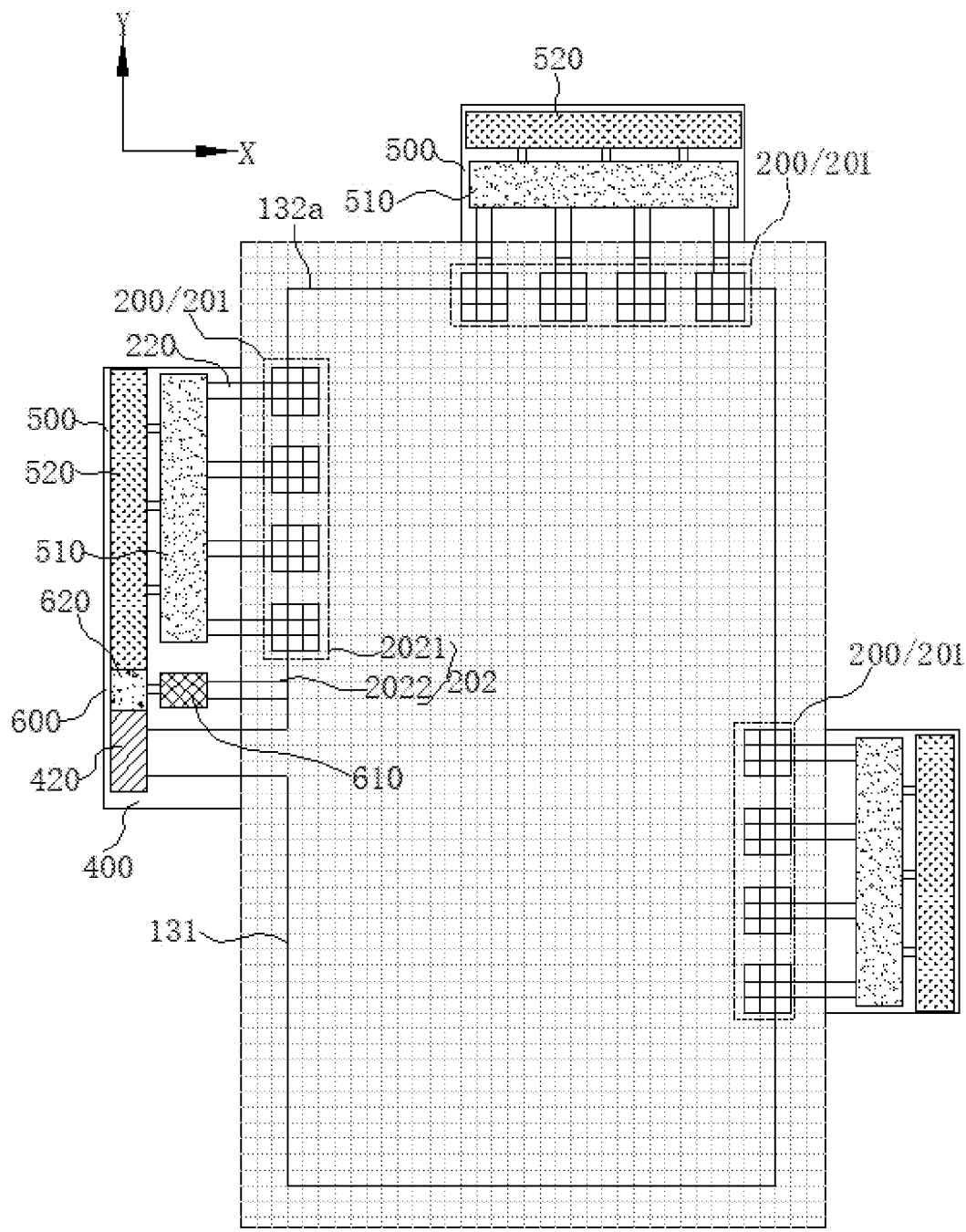
FIG. 31 is a schematic structural view of a wireless communication apparatus according to a second embodiment of a second aspect of the present application.

In some optional embodiments, as shown in FIG. 31, the antenna 200 further includes the non-millimeter-wave antenna 202. For example, at least one millimeter-wave antenna unit 210 is reused as a part of the non-millimeter-wave antenna 202. The wireless communication apparatus may further include a third circuit board 600 and a third transmission line disposed on the third circuit board 600, the third transmission line is in communication with the non-millimeter-wave antenna 202.

At least two of the third circuit board 600, the second circuit board 500 and the first circuit board 400 are formed integrally to simplify the structure of the wireless communication apparatus. When there are a plurality of millimeter-wave antenna arrays 201, there are a plurality of second circuit boards 500, and at least one of the third circuit board 600 and the first circuit board 400 may be integrated with at least one of the second circuit boards 500.

Optionally, the wireless communication apparatus further includes a third connection socket 620 disposed on the third circuit board 600 and being in communication with the third transmission line. Optionally, the wireless communication apparatus further includes a third integrated circuit 610 disposed on the third circuit board 600. The third connection socket 620 is in communication with the third integrated circuit 610 and is configured to enable the communication between the third integrated circuit 610 and the PCB of the wireless communication apparatus.

The third integrated circuit 610 is in communication with the non-millimeter-wave antenna 202, so the third integrated circuit 610 is a non-millimeter-wave radio frequency integrated circuit. Because the non-millimeter-wave radio frequency integrated circuit and the NFC radio frequency integrated circuit have the filtering and frequency selectivity, signals in other non-millimeter-wave bands do not have a significant influence on the NFC radio frequency integrated circuit, or NFC signals do not have a significant influence on the radio frequency integrated circuits corresponding to other non-millimeter-wave bands, so as to ensure a desired performance of the NFC radio frequency integrated circuit or radio frequency integrated circuits corresponding to other non-millimeter-wave bands.

Similarly, the third integrated circuit 610 is a non-millimeter-wave radio frequency integrated circuit, the second integrated circuit 510 is a millimeter-wave radio frequency integrated circuit, and the first integrated circuit 410 is a non-NFC radio frequency integrated circuit. Due to the filtering and frequency selectivity of the NFC radio frequency circuit, signals in the millimeter-wave band and the non-millimeter-wave band do not have a significant influence on the performance of the NFC radio frequency integrated circuit.

When the wireless communication apparatus includes three different types of connection sockets including the first connection socket 420, the second connection socket 520 and the third connection socket 620, at least two of the first connection socket 420, the second connection socket 520 and the third connection socket 620 are formed integrally to simplify the structure of the wireless communication apparatus. When there are a plurality of millimeter-wave antenna arrays 201, there are a plurality of second connection sockets 520, and the third connection socket 620 and the first connection socket 420 may be integrated with at least one of the second connection sockets 520.

Optionally, as shown in FIG. 31, the first circuit board 400, one of the second circuit boards 500 and the third circuit board 600 are formed integrally, and the first connection socket 420, one of the second connection sockets 520 and the third connection socket 620 are formed integrally to simplify the structure of the wireless communication apparatus as much as possible.

Figure 32:
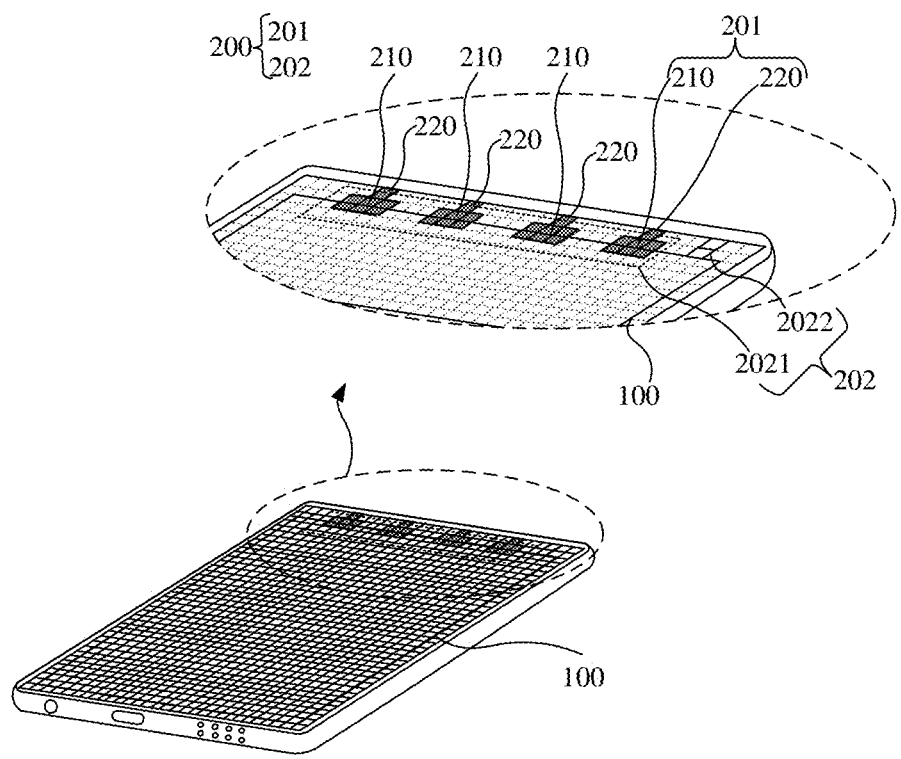
FIG. 32 is a schematic structural view of a wireless communication apparatus according to a third embodiment of a second aspect of the present application.

As shown in FIG. 32, the wireless communication apparatus provided by an embodiment of the present application includes a display panel. The display panel includes a loop structure 100 and an antenna 200. The antenna 200 includes a millimeter-wave antenna unit 210 and a non-millimeter-wave antenna 202. The millimeter-wave antenna unit 210 and the non-millimeter-wave antenna 202 are connected to the loop structure 100. The millimeter-wave antenna unit 210 and the millimeter-wave feeding portion 220 are connected with each other. A plurality of millimeter-wave antenna units 210 form a millimeter-wave antenna array 201. The non-millimeter-wave antenna 202 includes a first portion 2021 and a second portion 2022. At least a part of the first portion 2021 is formed by reusing at least one millimeter-wave antenna unit 210. The second portion 2022 is a feeding portion of the non-millimeter-wave antenna array 202.

Figure 33:
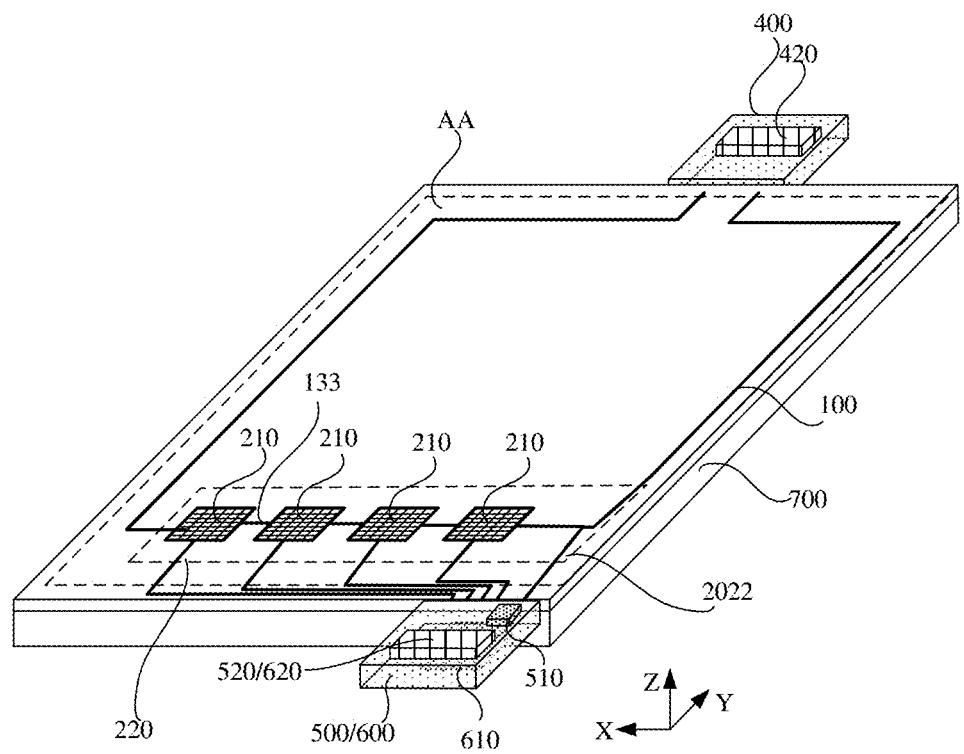
FIG. 33 is a schematic structural view of a wireless communication apparatus according to a fourth embodiment of a second aspect of the present application.
Figure 34:
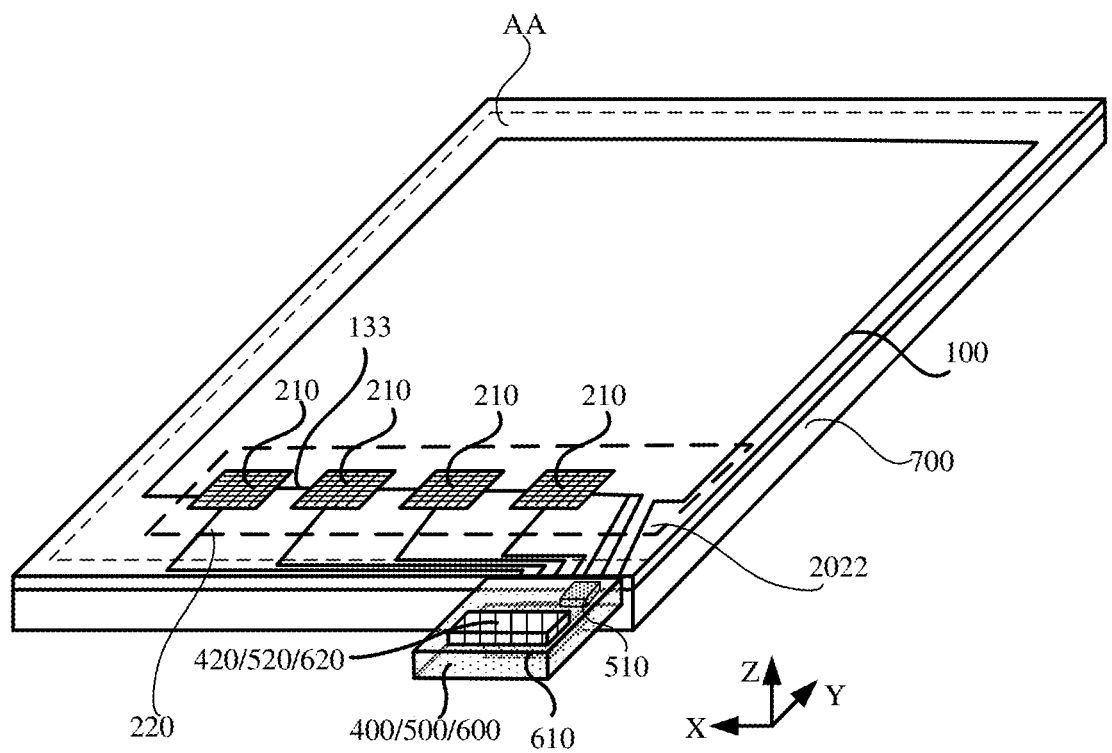
FIG. 34 is a schematic structural view of a wireless communication apparatus according to a fifth embodiment of a second aspect of the present application.

With reference to FIG. 33 to FIG. 34, the wireless communication apparatus further includes the first circuit board 400, the second circuit board 500 and the third circuit board 600. The wireless communication apparatus includes the first connection socket 420 disposed on the first circuit board 400, the first connection socket 420 is configured to communicate with the loop structure 100. The wireless communication apparatus includes the second integrated circuit 510 and the second connection socket 520 disposed on the second circuit board 500. The wireless communication apparatus includes the third integrated circuit 610 and the third connection socket 620 disposed on the third circuit board 600. In an embodiment of the present application, the second circuit board 500 and the third circuit board 600 being integrally formed and the second connection socket 520 and the third connection socket 620 being integrally formed is taken as an example for illustration.

In other embodiments, as shown in FIG. 34, the first circuit board 400, the second circuit board 500 and the third circuit board 600 may be integrally formed, and the first connection socket 420, the second connection socket 520 and the third connection socket 620 may also be integrally formed.

Figure 35:
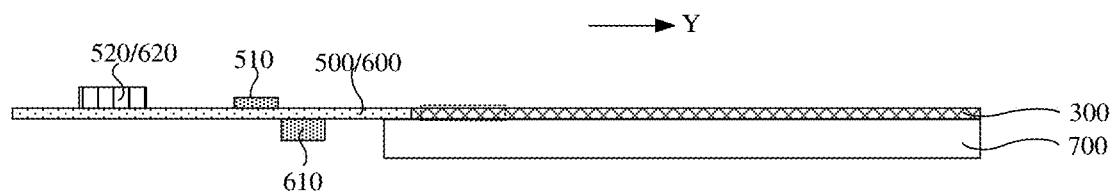
FIG. 35 is a schematic structural view of a wireless communication apparatus according to a sixth embodiment of a second aspect of the present application.
Figure 36:
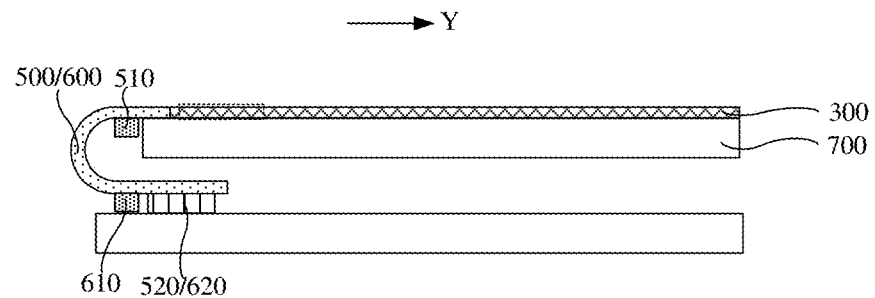
FIG. 36 is a schematic structural view of a wireless communication apparatus according to a seventh embodiment of a second aspect of the present application.

As shown in FIG. 35 and FIG. 36, the wireless communication apparatus further includes a substrate 700. The loop structure 100 and the antenna 200 are arranged in the touch-control layer 300. The touch-control layer 300 is arranged on the substrate 700. As shown in FIG. 35, the second circuit board 500 and the third circuit board 600 may be arranged in the non-display area of the wireless communication apparatus. Alternatively, as shown in FIG. 36, the second circuit board 500 and the third circuit board 600 are flexible circuit boards. The second integrated circuit 510 and the third integrated circuit 610 may be respectively bound to the second circuit board 500 and the third circuit board 600 by a chip on film (COF) process. The second circuit board 500 and the third circuit board 600 are bent to a non-display side of the wireless communication apparatus.

In other optional embodiments, the first circuit board 400 may also be a flexible circuit board and is bent to the non-display side of the wireless communication apparatus.

When the first circuit board 400, the second circuit board 500 and the third circuit board 600 are integrally formed, the second integrated circuit 510 and the third integrated circuit 610 may be bound to a same circuit board by the COF process.

In any of the above embodiments, the loop structure 100, the millimeter-wave antenna array 201 and the non-millimeter-wave antenna 202 are all used for wireless communication having a corresponding frequency band. The loop structure 100 may include a coupled portion and a feeding portion, while the non-millimeter-wave antenna 202 includes a radiating portion and a feeding portion. For example, the coil body 130 is a coupled portion of the loop structure 100. The first connection end 110 and the second connection end 120 are the feeding portion of the loop structure 100. The loop structure 100 may be short-distance fixed-point wireless communication.

Optionally, transmission frequencies of the millimeter wave antenna array 201 are different form the transmission frequencies of non-millimeter wave antenna 202. For example, frequencies of non-millimeter waves commonly used in the mobile wireless communication are higher than 24.25 GHz, that is to say, the millimeter wave antenna array 201 refers to an antenna array that transmits/receives wireless signals having frequencies higher than 24.25 GHz.

For example, frequencies of non-millimeter waves commonly used in mobile wireless communication are higher than 410 MHz and lower than 7.125 GHz, that is to say, the non-millimeter wave antenna 202 refers to an antenna that transmits/receives wireless signals having frequencies higher than 410 MHz and lower than 7.125 GHz. The coil body 130 transmits/receives wireless signals through coupling, and frequencies of the wireless signals transmitted/received by the coil body 130 through coupling may be lower than 410 MHz.

In any of the foregoing embodiments, optionally, the millimeter wave antenna array 201 and the non-millimeter wave antenna 202 are antennas configured for mobile wireless communication. That is to say, the millimeter wave antenna array 201 and the non-millimeter wave antenna 202 are antennas used for mobile wireless communication.

The communication frequency band of the non-millimeter-wave antenna in mobile wireless communication is 410 MHz to 7.125 GHz. The non-millimeter-wave antenna 202 herein usually refers to antenna corresponding to the non-millimeter-wave band in mobile wireless communication (including cellular antennas in 5G and previous generation, WLAN antennas, Bluetooth antennas, GNSS antennas, etc.).

For example, the loop structure 100 is the NFC coil, and a communication frequency band of the NFC coil is, for example, 13.56 MHz. Alternatively, the loop structure 100 is the WPC coil, and a communication frequency band of a commonly used WPC coil is, for example, higher than or equal to 100 kHz. The NFC coil and the WPC coil are coupled coils used in non-mobile wireless communication (because currently the NFC coil and the WPC coil need to be geologically referenced to a counterpart communication apparatus).

Optionally, the loop structure 100 may further include the frequency modulation (FM) coil. A frequency band of the common FM is 87 MHz-108 MHz, and the FM coil is applied to long-distance wireless non-mobile communication.

Although the present application has been described with reference to the preferred embodiments, various modifications may be made thereto and components thereof may be replaced with equivalents without departing from the scope of the present application. In particular, as long as there is no structural conflict, various technical features mentioned in various embodiments can be combined in any manner. This application is not limited to the specific embodiments disclosed herein, instead, it includes all technical solutions that fall within the scope of the claims.

What is claimed is:

1. A wireless communication structure, comprising:
   a loop structure comprising a first connection end, a second connection end and a coil body, at least a part of the coil body being connected between the first connection end and the second connection end;
   an antenna comprising a plurality of millimeter-wave antenna units configured to transmit and/or receive wireless signals in millimeter-wave band, wherein at least two of the plurality of millimeter-wave antenna units form a millimeter-wave antenna array;
   the at least two millimeter-wave antenna units in the millimeter-wave antenna array are connected to the coil body, the coil body comprises a first connection segment, a second connection segment and a third connection segment, the first connection segment is connected between the first connection end and the millimeter-wave antenna array, the second connection segment is connected between the millimeter-wave antenna array and the second connection end, and the third connection segment is connected between two adjacent millimeter-wave antenna units in the millimeter-wave antenna array,
   wherein the antenna further comprises a non-millimeter-wave antenna configured to transmit and/or receive wireless signals in non-millimeter-wave band, and the non-millimeter-wave antenna is connected to the coil body.

2. The wireless communication structure according to claim 1, wherein the antenna comprises a plurality of millimeter-wave antenna arrays, the first connection segment is connected between one of the plurality of millimeter-wave antenna arrays and the first connection end, the second connection segment comprises a first sub-segment and a second sub-segment, the first sub-segment is connected between two millimeter-wave antenna arrays, and the second sub-segment is connected between another one of the plurality of millimeter-wave antenna arrays and the second connection end.

3. The wireless communication structure according to claim 1, wherein,
   the plurality of millimeter-wave antenna units comprise a millimeter-wave wire;
   a line width of at least one of the first connection segment, the second connection segment and the third connection segment is less than or equal to a line width of the millimeter-wave wire.

4. The wireless communication structure according to claim 1, wherein at least one of the millimeter-wave antenna units is reused as a part of the non-millimeter-wave antenna.

5. The wireless communication structure according to claim 1, wherein the coil body comprises at least one blocking portion, and the at least one blocking portion is configured to allow signal currents transmitted and/or received by the loop structure to pass through and block wireless signal currents in non-millimeter-wave band transmitted and/or received by the non-millimeter-wave antenna.

6. The wireless communication structure according to claim 5, wherein the at least one blocking portion comprises at least two blocking portions, and the at least two blocking portions are spaced apart from one another on the coil body.

7. The wireless communication structure according to claim 1, wherein the loop structure is configured to transmit and/or receive wireless signals in non-millimeter-wave band, and the coil body is configured to transmit and/or receive wireless signals in non-millimeter-wave band by coupling.

8. The wireless communication structure according to claim 1, wherein the coil body comprises a plurality of coils, and the at least two millimeter-wave antenna units in the millimeter-wave antenna array are connected to at least one of the coils.

9. The wireless communication structure according to claim 8, wherein the plurality of coils comprise an inner coil and an outer coil, each of the inner coil and the outer coil is connected between the first connection end and the second connection end, and the outer coil is located on a side of the inner coil away from a center of the wireless communication structure, the millimeter-wave antenna unit is connected to the outer coil, or, the millimeter-wave antenna unit is connected to the inner coil, and the antenna further comprises a millimeter-wave feeding portion connected to the millimeter-wave antenna unit, and at least a part of the millimeter-wave feeding portion is disposed in a different layer from the outer coil.

10. The wireless communication structure according to claim 8, wherein the plurality of coils are connected in series and are arranged in a spiral shape.

11. The wireless communication structure according to claim 8, wherein the plurality of coils comprise a first coil and a second coil, each of the first coil and the second coil is connected between the first connection end and the second connection end, a part of the first coil is located on a side of the second coil away from the center of the wireless communication structure, a part of the second coil is located on a side of the first coil away from the center of the wireless communication structure, and the millimeter-wave antenna unit is connected to the first coil or the second coil.

12. The wireless communication structure according to claim 8, wherein the plurality of coils comprise a direct-fed coil and a coupled coil, the direct-fed coil is connected between the first connection end and the second connection end, the coupled coil is coupled to the direct-fed coil, the coupled coil is disposed by the side of the direct-fed coil and spaced apart from the direct-fed coil, and the millimeter-wave antenna array is connected to the coupled coil or the direct-fed coil.

13. A display panel, comprising the wireless communication structure according to claim 1.

14. The display panel according to claim 13, further comprising a touch-control layer, wherein the touch-control layer comprises a metal wiring in a grid pattern, and the loop structure and the antenna are located in the touch-control layer.

15. The display panel according to claim 13, wherein the display panel comprises a first area and a second area surrounding the first area, the first area is a display area, the second area comprises a display area and/or a non-display area, and the loop structure is located in the second area, wherein the coil body is disposed in the second area and surrounds the first area.

16. A wireless communication apparatus, comprising the display panel according to claim 13, wherein the antenna comprises a plurality of millimeter-wave antenna arrays, and the wireless communication apparatus comprises a plurality of circuit boards corresponding to the plurality of millimeter-wave antenna arrays respectively.

17. The wireless communication apparatus according to claim 16, further comprising:

a first circuit board and a first transmission line disposed on the first circuit board, the first transmission line being in communication with the first connection end and/or the second connection end of the loop structure;

a second circuit board and a second transmission line disposed on the second circuit board, the second transmission line being in communication with the millimeter-wave antenna unit;

wherein the first circuit board is integrated with the second circuit board.

18. The wireless communication apparatus according to claim 17, wherein the wireless communication apparatus comprises a first connection socket disposed on the first circuit board, and the first transmission line is connected to the first connection socket;

the wireless communication apparatus comprises a second connection socket disposed on the second circuit board, and the second transmission line is connected to the second connection socket;

the first connection socket is integrated with the second connection socket.

19. The wireless communication apparatus according to claim 18, wherein the antenna further comprises a non-millimeter-wave antenna configured to transmit and/or receive wireless signals in non-millimeter-wave band, and the wireless communication apparatus further comprises:

a third circuit board and a third transmission line disposed on the third circuit board, the third transmission line being in communication with the non-millimeter-wave antenna, wherein the first circuit board, the second circuit board and the third circuit board are formed integrally; and a third connection socket disposed on the third circuit board, the third transmission line being connected to the third connection socket, wherein the first connection socket, the second connection socket and the third connection socket are formed integrally.

* * * * *